United States Patent
Ye et al.

(10) Patent No.: US 12,238,275 B2
(45) Date of Patent: Feb. 25, 2025

(54) METHOD AND APPARATUS FOR SIGNALING AND CONSTRUCTION OF VIDEO CODING REFERENCE PICTURE LISTS

(71) Applicant: InterDigital VC Holdings, Inc., Wilmington, DE (US)

(72) Inventors: Yan Ye, San Diego, CA (US); Yong He, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 274 days.

(21) Appl. No.: 17/945,714

(22) Filed: Sep. 15, 2022

(65) Prior Publication Data

US 2023/0026503 A1  Jan. 26, 2023

Related U.S. Application Data

(63) Continuation of application No. 16/923,364, filed on Jul. 8, 2020, now Pat. No. 11,490,074, which is a continuation of application No. 15/260,392, filed on Sep. 9, 2016, now Pat. No. 10,771,780, which is a continuation of application No. 13/738,437, filed on Jan. 10, 2013, now Pat. No. 9,467,695.

(60) Provisional application No. 61/588,571, filed on Jan. 19, 2012.

(51) Int. Cl.
| | |
|---|---|
| H04N 19/105 | (2014.01) |
| H04N 19/103 | (2014.01) |
| H04N 19/117 | (2014.01) |
| H04N 19/124 | (2014.01) |
| H04N 19/13  | (2014.01) |

(Continued)

(52) U.S. Cl.
CPC ......... *H04N 19/105* (2014.11); *H04N 19/103* (2014.11); *H04N 19/117* (2014.11); *H04N 19/124* (2014.11); *H04N 19/13* (2014.11); *H04N 19/139* (2014.11); *H04N 19/15* (2014.11); *H04N 19/503* (2014.11); *H04N 19/577* (2014.11); *H04N 19/61* (2014.11); *H04N 19/70* (2014.11); *H04N 19/172* (2014.11)

(58) Field of Classification Search
CPC .................................................. H04N 19/105
USPC ...................................................... 375/240.16
See application file for complete search history.

(56) References Cited

U.S. PATENT DOCUMENTS

| | | | |
|---|---|---|---|
| 8,891,613 | B2 | 11/2014 | Wahadaniah et al. |
| 9,467,695 | B2 | 10/2016 | Ye et al. |

(Continued)

FOREIGN PATENT DOCUMENTS

| | | |
|---|---|---|
| CN | 101461242 A | 6/2009 |
| CN | 101547368 A | 9/2009 |

(Continued)

OTHER PUBLICATIONS

Bross et al., "High Efficiency Video Coding (HEVC) Text Specification Draft 6", Document: JCTVC-H1003, Joint Collaborative Team on Video Coding (JCT-VC) of ITU-T SG16 WP3 and ISO/IEC JTC1/SC29/WG11, 8th Meeting: San José, CA, USA, 259 pages, Feb. 1-10, 2012.

(Continued)

*Primary Examiner* — Yulin Sun
(74) *Attorney, Agent, or Firm* — Xiaoan Lu

(57) ABSTRACT

Improved method and apparatus for signaling of reference pictures used for temporal prediction. The signaling schemes and construction process for different reference picture lists in HEVC Working Draft 5 (WD5) are improved.

20 Claims, 16 Drawing Sheets

(51) Int. Cl.
H04N 19/139 (2014.01)
H04N 19/15 (2014.01)
H04N 19/503 (2014.01)
H04N 19/577 (2014.01)
H04N 19/61 (2014.01)
H04N 19/70 (2014.01)
H04N 19/172 (2014.01)

(56) References Cited

U.S. PATENT DOCUMENTS

| | | |
|---|---|---|
| 2005/0152452 A1 | 7/2005 | Suzuki |
| 2005/0152458 A1 | 7/2005 | Tanaka |
| 2010/0020871 A1 | 1/2010 | Hannuksela et al. |
| 2010/0046619 A1 | 2/2010 | Koo et al. |
| 2010/0086036 A1 | 4/2010 | Jeon et al. |
| 2010/0091845 A1 | 4/2010 | Jeon et al. |
| 2010/0118933 A1 | 5/2010 | Pandit et al. |
| 2010/0135391 A1 | 6/2010 | Tian et al. |
| 2010/0202519 A1 | 8/2010 | Koo et al. |
| 2010/0208828 A1 | 8/2010 | Lu et al. |
| 2010/0296579 A1 | 11/2010 | Panchal et al. |
| 2010/0316360 A1 | 12/2010 | Jeon et al. |
| 2012/0069905 A1* | 3/2012 | Kato .............. H04N 19/196 375/E7.243 |
| 2012/0269275 A1* | 10/2012 | Hannuksela ........... H04N 19/34 375/E7.026 |
| 2013/0089134 A1 | 4/2013 | Wang et al. |
| 2013/0094774 A1* | 4/2013 | Misra .............. H04N 19/58 382/233 |
| 2013/0114680 A1* | 5/2013 | Leontaris ........... H04N 13/161 375/240.02 |
| 2014/0003521 A1 | 1/2014 | Lee et al. |
| 2020/0336737 A1* | 10/2020 | Ye .................... H04N 19/124 |

FOREIGN PATENT DOCUMENTS

| | | |
|---|---|---|
| CN | 101816180 A | 8/2010 |
| CN | 101902656 A | 12/2010 |
| CN | 102263962 A | 11/2011 |
| EP | 1439705 A3 | 9/2011 |
| EP | 2770734 A1 | 8/2014 |
| JP | 2009532930 A | 9/2009 |
| JP | 2010524338 A | 7/2010 |
| JP | 2014511645 A | 5/2014 |
| TW | 200727603 A | 7/2007 |
| TW | 200742442 A | 11/2007 |
| TW | 200818919 A | 4/2008 |
| TW | 200904198 | 1/2009 |
| TW | 200904198 A | 1/2009 |
| TW | 201105145 A | 2/2011 |
| WO | WO2006001653 A1 | 1/2006 |
| WO | WO2006062377 A1 | 6/2006 |
| WO | WO2007114608 A1 | 10/2007 |
| WO | WO2008023967 A1 | 2/2008 |
| WO | WO2008123917 A2 | 10/2008 |
| WO | WO2011075071 A1 | 6/2011 |
| WO | WO2012067966 A1 | 5/2012 |
| WO | WO2012099656 A1 | 7/2012 |
| WO | WO2012122176 A1 | 9/2012 |
| WO | WO2012124961 A2 | 9/2012 |

OTHER PUBLICATIONS

Sjoberg et al., "Overview of HEVC High-Level Syntax and Reference Picture Management",IEEE Transactions on Circuits and Systemsfor Video Technology, IEEE Service Center, Piscataway,NJ, US, vol. 22, pp. 1858-1870, Dec. 12, 2022.
Bross et al., "WD4: Working Draft 4 of High-Efficiency Video Coding", Document: JCTVC-F803_d6, Joint Collaborative Team on Video Coding (JCT-VC) of ITU-T SG16 WP3 and ISO/IEC JTC1/SC29/WG11, 6th Meeting: Torino, IT, 228 pages, Jul. 14-22, 2011.
Tourapis et al., "H.264/MPEG-4 AVC Reference Software Manual", JM reference software JM18.2;Joint Video Team (JVT) of ISO/IEC MPEG & ITU-T VCEG; 24th Meeting: Geneva, CH, 75 pages, Jun. 2007.
Suzuki et al., "Extension of uni-prediction simplification in B slices", Document No. JCTVC-D421, Joint Collaborative Team on Video Coding (JCT-VC) of ITU-T SG16 WP3 and ISO/IEC JTC1/SC29/WG11_JCTVC-D421, 7 pages, Jan. 2011.
Ye et al., "AHG21: Reference picture lists combination syntax", Joint Collaborative Team on Video Coding (JCT-VC) of ITU-T SG16 WP3 and ISO/IEC JTC1/SC29/WG11, JCTVC-H0137, 6 pages, Feb. 2012.
Bross et al.,"WD5: Working Draft 5 of High-Efficiency Video Coding", Document: JCTVC-G1103_d4, Joint Collaborative Team on Video Coding (JCT-VC) of ITU-T SG16 WP3 and ISO/IEC JTC1/SC29/WG11, 7th Meeting: Gevena, CH,pp. 1-28, Nov. 21-30, 2011.
Boyce et al., "JCT-VC Break-Out Report: Reference Picture Buffering and List Construction (AHG21)", BoG report: Reference picture buffering and list construction. Document No. JCTVC-G1002, 8 pages, Nov. 2011.
Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11; Document No. JCTVC-G1103, 238 pages, Nov. 2011.
He et al., "AHG21: Unification of Reference Picture List Modification Processes", Joint Collaborative Team on Video Coding (JCT-VC) of ITU-T SG16 WP3 and ISO/IEC JTC1/SC29/WG11, JCTVC-H0138, 6 pages, Feb. 2012.
Yu, et al., "The Reference Picture Construction of Combined List for HEVC", Joint Collaborative Team on Video Coding (JCT-VC) of ITU-T SG16 WP3 and ISO/IEC JTC1/SC29/WG11_JCTVC-G717, 6 pages, Nov. 2011.
Anonymous, "Advanced Video Coding for Generic Audiovisual Services", Telecommunication Standardization Sector of ITU, Recommendation ITU-T H.264, Series H: Audiovisual and MulitMedia Systems—Infrastructure of Audiovisual Services—Coding of Moving Video, 282 pages, May 2003.
Wang, et al, "On reference picture list construction for uni-predicted partitions", Joint Collaborative Team on Video Coding (JCT-VC) of ITU-T SG16 WP3 and ISO/IEC JTC1/SC29/WG11, Document: JCTVC-E348, 6 pages, Mar. 16-23, 2011.
Anonymous, Advanced video coding for generic audiovisual services, ITU-T Rec H.264 and ISO/IEC/MPEG 4 part 10, Mar. 2010,676 pages.
Flynn et al., "JCTVC AHG report: Reference picture buffering and list construction (AHG21)", Document No. JCTVC-G021; 7th Meeting Geneva, CH, 21-30, 9 pages, Nov. 2011.
Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11; Document No. JCTVC-G1103_d9, 237 pages, Nov. 21-30, 2011.
Wang et al., "AHG21: On DPB management", Joint Collaborative Team on Video Coding (JCT-VC) of ITU-T SG16 WP3 and ISO/IEC JTC1/SC29/WG11 JCTVC-G314, ITU-T, 7 pages, Nov. 21-30, 2011.
Fang, et al., "The Construction of Combined List for HEVC", Joint Collaborative Team on Video Coding (JCTVC) of ITU-T SG16 WP3 and ISO/IEC JTC1/SC29/WG11_JCTVC-F573, 6 pages, Jul. 14, 2011.
Bross, et al., "High Efficiency Video Coding (HEVC) text specification draft 9", Joint Collaborative Team on Video Coding (JCT-VC) of ITU-T SG16 WP3 and ISO/IEC JTC1/SC29/WG11, (JCTVC-K1003_v13), 317 pages, Oct. 10-19, 2012.
Yu et al., "Modifications on Signaling Collocated Picture", Joint Collaborative Team on Video Coding (JCT-VC) of ITU-T SG 16 WP3 and ISO/IEC JTC 1/SC 29/WG11, JCTVC-I0266, Apr. 7, 2012, 4 pages.
Anonymous, "VC-1 Compressed Video Bitstream Format and Decoding Process—Amendment 2", SMPTE Amendment 2:2011 Smpte 421M-2006, Society of Motion Picture and Television Engineers, Feb. 2011, 5 pages.

(56) References Cited

OTHER PUBLICATIONS

He, et al., "AHG15: Clarification of Mapping Process for Reference Picture Lists Combination in B Slices", Joint Collaborative Team on Video Coding (JCT-VC) of ITU-T SG 16 WP 3 and ISO/IEC JTC 1/SC 29/WG11, JCTVC-I0220, 6 pages, Apr. 27, 2012.
Bross et al., WD5: Working Draft 5 of High-Efficiency Video Coding, JCTVC-G1103_d0, Joint Collaborative Team on Video Coding (JCT-VC) of ITU-T SG16 WP3 and ISO/IEC JTC1/SC29/WG11, 7th Meeting: Gevena, CH, pp. 1-215, Nov. 21-30, 2011.
Fang et al., "The Construction of Combined List for HEVC", Joint Collaborative Team on Video Coding (JCT-VC) of ITU-T SG16 WP3 and ISO/IEC JTC1/SC29/WG11, JCTVC-F573-r2, 6 pages, Jul. 14-22, 2011.
McCann, et al., "HM5: High Efficiency Video Coding (HEVC) Test Model 5 Encoder Description", Joint Collaborative Team on Video Coding (JCT-VC) of ITU-T SG16 WP3 and ISO/IEC JTC1/SC29/WG11; Document No. JCTVC-G1102, 45 pages, Nov. 21-30, 2011.
He et al., "AHG21: Unification of Reference Picture List Modification Processes", Joint Collaborative Team on Video Coding (JCT-VC) of ITU-T SG16 WP3 and ISO/IEC JTC1/SC29/WG11, 8th Meeting, San Jose, CA, USA, Document: JCTVC-H0138_r2, 11 pages, Feb. 1-10, 2012.
Wahadaniah,et al., "AHG21: Construction and modification of predefined reference picture sets and reference picture lists", Joint Collaborative Team on Video Coding (JCT-VC) of ITU-T SG16 WP3 and ISO/IEC JTC1/SC29/WG11, 7th Meeting: Geneva, CH, JCTVC-G548, 21 pages, Nov. 21-30, 2011.
Yu et al., "Implicit signaling of collocated picture for HEVC", Document: JCTVC-H548, Joint Collaborative Team on Video Coding (JCT-VC) of ITU-T SG16 WP3 and ISO/IEC JTC1/SC29/WG11, 8th Meeting: San Jose. CA, USA, pp. 1-6, Feb. 1-10, 2012.

\* cited by examiner

FIG. 11

METHOD AND APPARATUS FOR SIGNALING AND CONSTRUCTION OF VIDEO CODING REFERENCE PICTURE LISTS

CROSS-REFERENCE TO RELATED APPLICATIONS

This application is a continuation of co-pending U.S. application Ser. No. 16/923,364, filed Jul. 8, 2020, which is a continuation of U.S. application Ser. No. 15/260,392, filed Sep. 9, 2016 (U.S. Pat. No. 10,771,780), which is a continuation of U.S. application Ser. No. 13/738,437, filed Jan. 10, 2013, (U.S. Pat. No. 9,467,695), which claims the benefit of U.S. Provisional Application Ser. No. 61/588,571 filed Jan. 19, 2012, which is incorporated by reference herein in its entirety.

BACKGROUND

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG1/2/4 part 2, H.264/MPEG-4 part 10 AVC [1][3] and VC-1 [2] standards.

FIG. 1 is a block diagram of a generic block-based hybrid video encoding system. The input video signal 102 is processed block by block. In all existing video coding standards, the video block unit consists of 16×16 pixels; such a block unit is also commonly referred to as a macro-block or MB. Currently, JCT-VC (Joint Collaborative Team on Video Coding) of ITU-T/SG16/Q.6/VCEG and ISO/IEC/MPEG is developing the next generation video coding standard called High Efficiency Video Coding or HEVC [4]. In HEVC, extended block sizes (called a "coding unit" or CU) are used to efficiently compress high resolution (1080p and beyond) video signals. In HEVC, a CU can be up to 64×64 pixels. A CU can be further partitioned into prediction units or PUs, for which separate prediction methods are applied. For each input video block (MB or CU), spatial prediction (160) and/or temporal prediction (162) may be performed. Spatial prediction (or "intra prediction") uses pixels from the already coded neighboring blocks in the same video picture/slice to predict the current video block. Spatial prediction reduces spatial redundancy inherent in the video signal. Temporal prediction (also referred to as "inter prediction" or "motion compensated prediction") uses pixels from the already coded video pictures (commonly referred to as "reference pictures") to predict the current video block. Temporal prediction reduces temporal redundancy inherent in the video signal. Temporal prediction signal for a given video block is usually signaled by one or more motion vectors that indicate the amount and the direction of motion between the current block and its prediction block in the reference picture. Also, if multiple reference pictures are supported (as is the case for the recent video coding standards such as H.264/AVC or HEVC), then, for each video block, its reference picture index is sent additionally. The reference picture index identifies which reference picture in the reference picture store (164) (also referred to as "decoded picture buffer" or DPB) the temporal prediction signal is to be obtained in order to generate the prediction of the current video block that is to be reconstructed. After spatial and/or temporal prediction, the mode decision block (180) in the encoder chooses the best prediction mode, for example, based on the rate-distortion optimization method. The prediction block is then subtracted from the current video block (116); and the prediction residual is transformed (104) and quantized (106). The quantized residual coefficients are inverse quantized (110) and inverse transformed (112) to form the reconstructed residual, which is then added back to the prediction block (126) to form the reconstructed video block. Further in-loop filtering such as deblocking filters, Sample Adaptive Offset, and Adaptive Loop Filters may be applied (166) on the reconstructed video block before it is put in the reference picture store (164) and used to code future video blocks. To form the output video bitstream 120, coding mode (inter or intra), prediction mode information, motion information, and quantized residual coefficients are all sent to the entropy coding unit (108) to be further compressed and packed to form the bitstream.

FIG. 2 gives a general block diagram of a block-based video decoder. The video bitstream 202 is first unpacked and entropy decoded at entropy decoding unit 208. The coding mode and prediction information are sent to either the spatial prediction unit 260 (if intra coded) or the temporal prediction unit 262 (if inter coded) to form the prediction block. If inter coded, the prediction information includes prediction block sizes, one or more motion vectors (indicating direction and amount of motion) and one or more reference indices (indicating from which reference picture the prediction signal is to be obtained). Motion compensated prediction is then applied by the temporal prediction unit 262 to form the temporal prediction block. The residual transform coefficients are sent to inverse quantization unit 210 and inverse transform unit 212 to reconstruct the residual block. The prediction block and the residual block are then added together at 226. The reconstructed block may further go through in-loop filtering before it is stored in reference picture store 264. The reconstructed video in reference picture store is then sent out to drive a display device, as well as used to predict future video blocks.

SUMMARY

Described herein are methods and systems that provide flexibility to improve the signaling of reference pictures used for temporal prediction (see block 162 in FIG. 1 and block 262 in FIG. 2). In particular, the signaling schemes and construction process for different reference picture lists in HEVC Working Draft 5 (WD5) [4][5] are improved.

In accordance with one embodiment, a method of generating reference picture lists L0 and L1 for decoding a predicted picture within video data comprises: generating a first ordered list of reference pictures from a decoded picture buffer (DPB) in which the list is ordered with the reference pictures in the DPB that are temporally before the current picture, if any, listed in order by temporal distance from the current picture, followed by the reference pictures from the DPB that are temporally later than the current picture, if any, listed in order by temporal distance from the current picture, followed by long term reference pictures in the DPB, if any, in the order in which they are stored in the DPB; generating a second ordered list of reference pictures from a decoded picture buffer (DPB) in which the list is ordered with the reference pictures in the DPB that are temporally later than the current picture, if any, listed first in order by temporal distance from the current picture, followed by the reference pictures in the DPB that are temporally before the current picture, if any, listed in order by temporal distance from the current picture, followed by long term reference pictures in the DPB, if any, in the order in which they are stored in the DPB; generating at least one of lists L0 and L1 by selecting reference pictures from the first ordered list and the second ordered list, respectively.

In accordance with another embodiment, a method for initializing a decoder for reference picture lists for decoding a P or B slice header comprises: constructing a first temporary list, RefPicSetCurrTempList0, by:

cIdx=0
NumRpsCurrTempList=NumRpsStCurr0+NumRpsStCurr1+NumRpsLtCurr
for (i=0; i<NumRpsStCurr0; cIdx++, i++)
    RefPicSetCurrTempList0 [cIdx]=RefPicSetStCurr0[i]
for (i=0; i<NumRpsStCurr1; cIdx++, i++)
    RefPicSetCurrTempList0 [cIdx]=RefPicSetStCurr1[i]
for (i=0; i<NumRpsLtCurr; cIdx++, i++)
    RefPicSetCurrTempList0 [cIdx]=RefPicSetLtCurr[i].

In accordance with yet another embodiment, a method of signaling modifications to a plurality of reference picture lists comprises signaling the modifications to the plurality of reference picture lists using a unified signaling syntax.

In accordance with one further embodiment, a method comprises: determining a number of entries in a reference picture list; generating a message including a value identifying an entry in the reference picture list, wherein the value is represented by a single bit if the number of entries in the reference picture list is two, the value is represented by multiple bits if the number of entries in the reference picture list is three or more, and the message omits the value if the number of entries in the reference picture list is one.

In accordance with one more embodiment, a method of creating a combined list, LC, of reference pictures to be used for decoding a P or B picture from a first list of reference pictures, L0, and a second list of reference pictures, L1 comprises: determining if L0 contains more than one entry; determining if L1 contains more than one entry; if either L0 or L1 contains more than one entry, using a syntax element ref_idx_list_curr to indicate entries in at least one of L0 and L1 to be added into LC; if L0 contains only one entry, setting ref_idx_list_curr to 0; if L1 contains only one entry, setting ref_idx_list_curr to 0; and creating LC using the value of ref_idx_list_curr.

BRIEF DESCRIPTION OF THE DRAWINGS

A more detailed understanding may be had from the following description, given by way of example in conjunction with the accompanying drawings wherein:

FIG. 11 is a ref_pic_list_modification process for the same example as in FIG. 9 in accordance with the principles of one embodiment of the present invention;

DETAILED DESCRIPTION

As used herein, the terms "temporal prediction," "motion prediction," "motion compensated prediction," and "inter prediction" are used interchangeably; and the terms "reference picture store", "decoded picture buffer", and "DPB" are used interchangeably.

In accordance with known techniques adopted in the H.264 and HEVC WD 5, temporal prediction of video blocks may be performed using a uni-prediction technique or a bi-prediction technique. In order to perform prediction in accordance with such techniques, reference picture lists are signaled and constructed. For uni-prediction, there may be a single list of reference pictures from which the blocks in the current picture are predicted. For bi-prediction, there are two lists, L0 and L1, with one reference picture being selected from each list to form predictions of the blocks in the current picture. Yet further, proposals have been made (but are no longer incorporated in the latest HEVC WD9 [9] at the time of writing) for bi-prediction techniques that include use of a third list that is a combination of the first two lists L0 and L1, herein termed list LC. Described herein are methods and systems for an efficient unified technique for signaling of a modification syntax for all reference picture lists L0, L1, and/or LC as well as a technique for signaling of the combined reference picture list, LC.

Figure 1:
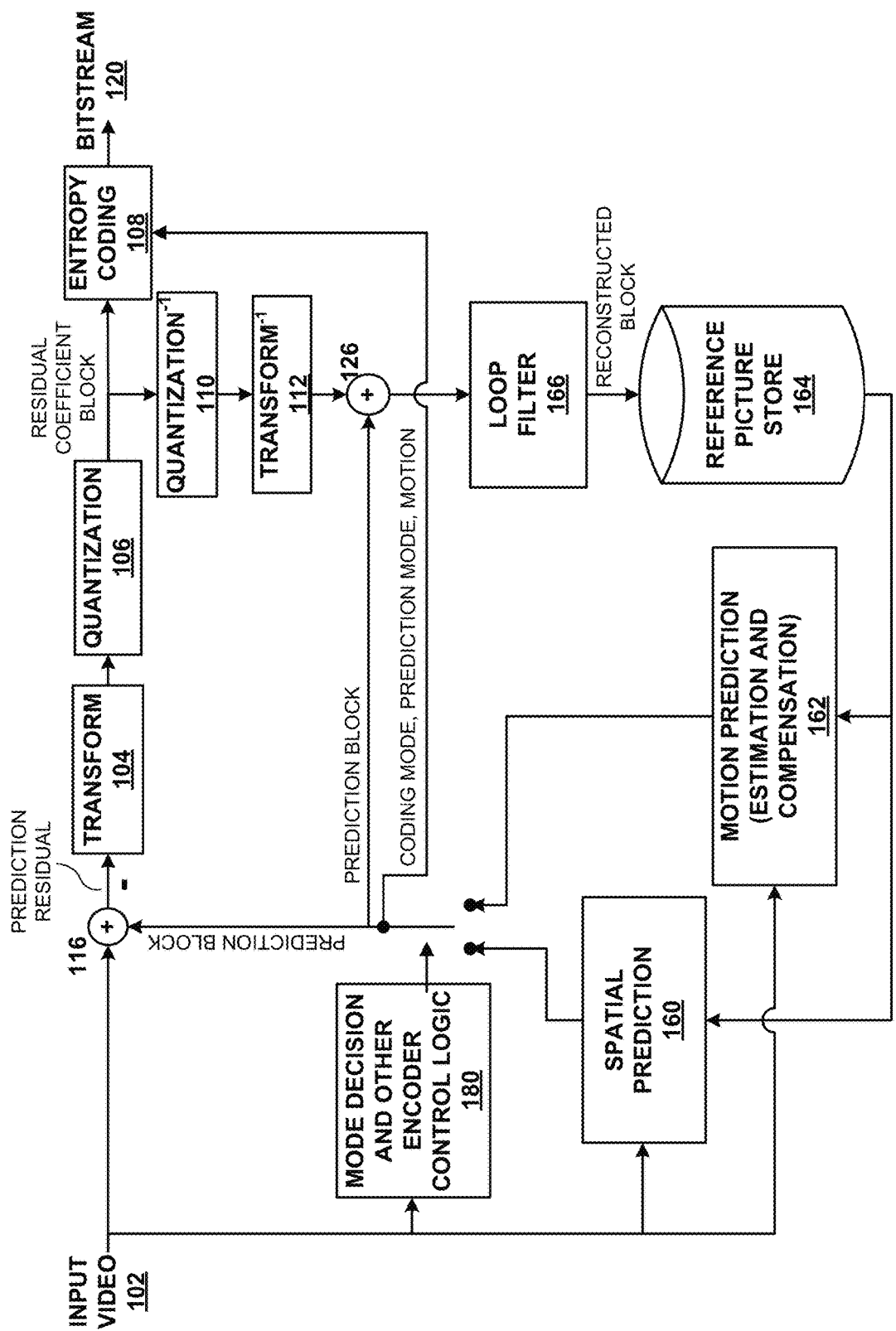
FIG. 1 is a block diagram of a block-based hybrid video encoding scheme in which an embodiment of the invention may be incorporated.
Figure 2:
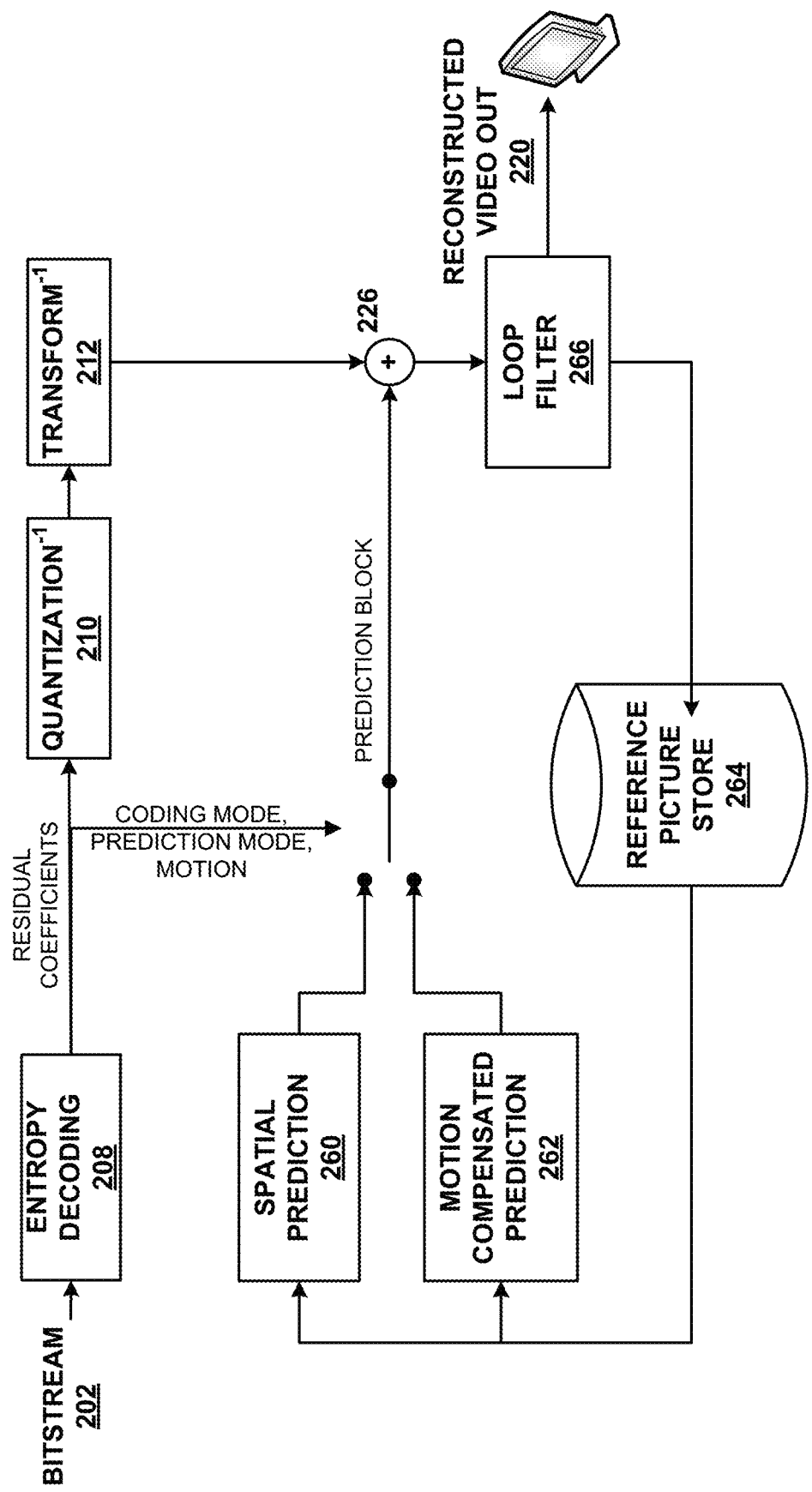
FIG. 2 is a block diagram of a block-based video decoding scheme in which an embodiment of the invention may be incorporated.
Figure 3:
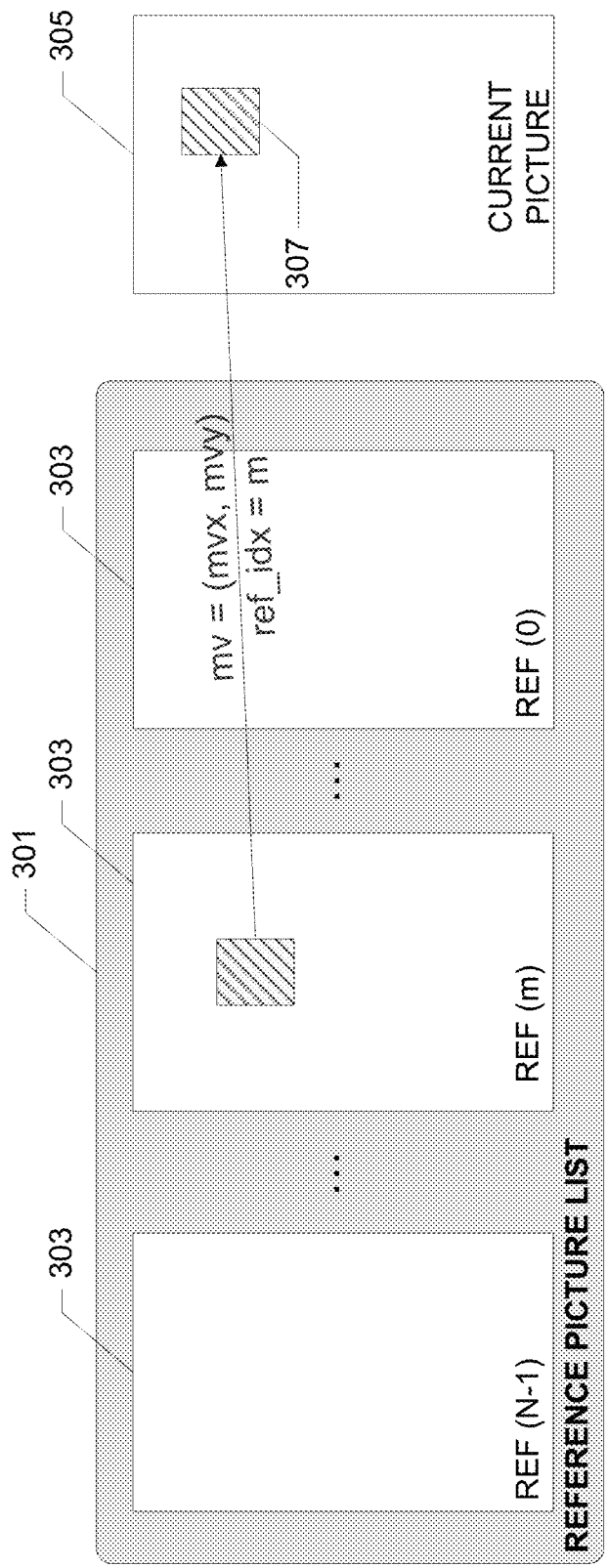
FIG. 3 depicts temporal uni-prediction from a reference picture store containing multiple reference pictures in accordance with the prior art.

FIG. 3 helps diagrammatically illustrate uni-prediction from a single reference picture list 301 as may be performed by an inter prediction processor (e.g., block 162 in FIG. 1). In accordance with uni-prediction techniques, the reference picture list 301 contains links to video blocks, e.g., block 304, from neighboring, already-coded video frames to predict the current video block, and thus can exploit temporal correlation and remove temporal redundancy inherent in the video signal. These already-coded video frames are stored in a decoded picture buffer (DPB, e.g., reference picture store 164 in FIG. 1. H.264/AVC and HEVC WD5 allow the use of more than one reference picture. In FIG. 3, a list of N reference pictures 303, labeled as $ref^n$, n=0 . . . N−1, can be used to predict video blocks 307 in the current picture 305. Let us assume $ref^i$ is selected as the basis from which the current block 307 will be predicted with a motion vector of (mvx, mvy). Temporal prediction is performed as:

$$P(x,y) = ref^m(x-mvx, y-mvy) \quad (1)$$

where $ref^m(x, y)$ is the pixel value at location (x, y) in the reference picture $ref^m$, and P(x, y) is the predicted block. Existing video coding systems support inter prediction with fractional pixel precision [1][2][4]. When motion vector (mvx, mvy) has fractional pixel value, interpolation filters are applied to obtain the pixel values at fractional pixel positions.

In equation (1), the temporal prediction comes from one source (i.e., $ref^m$), which is commonly referred to as uni-prediction. A picture or a slice (a group of video blocks) in which all blocks in the picture or the slice are predicted using uni-prediction is commonly referred to as a P picture or a P slice.

Figure 4:
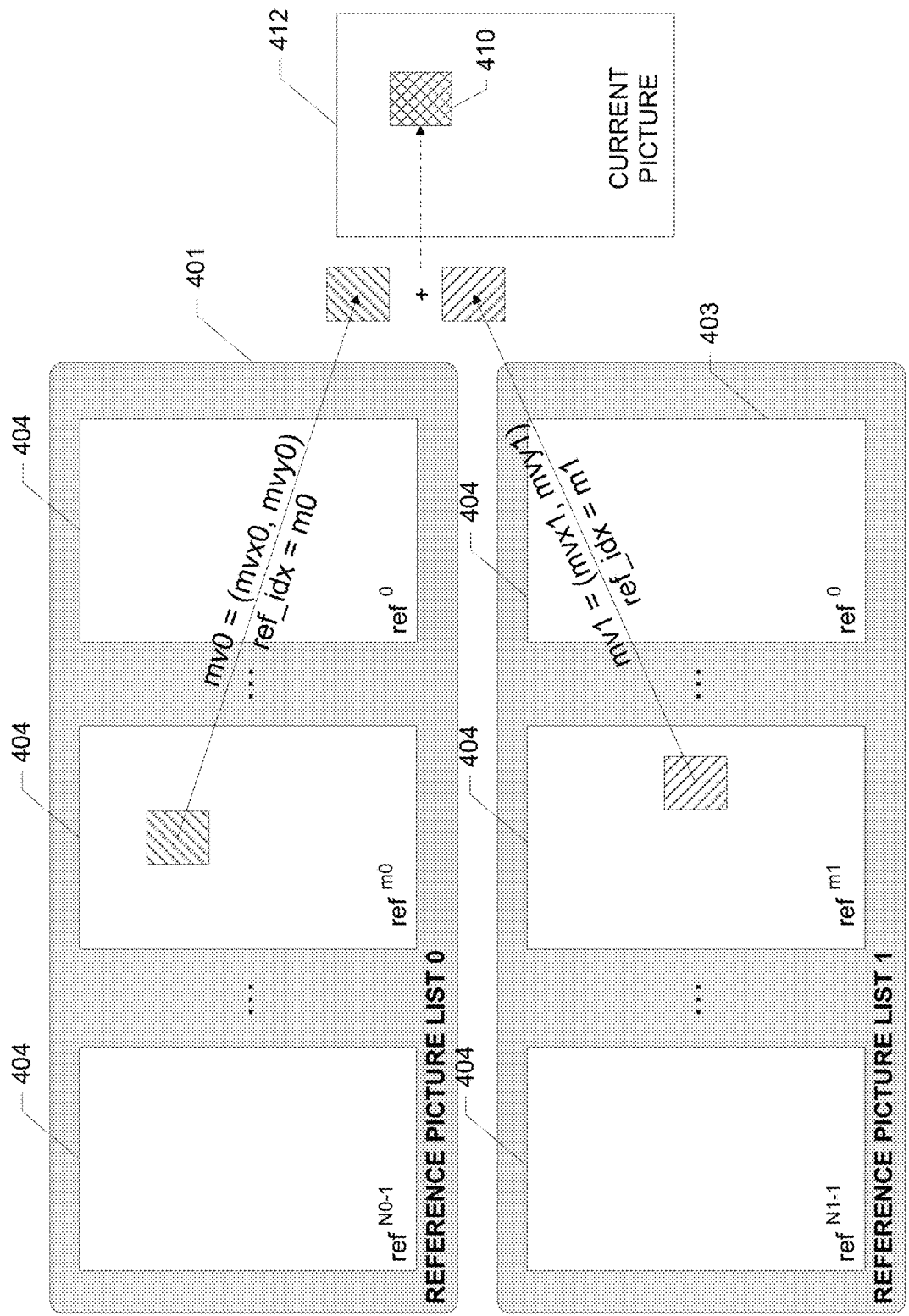
FIG. 4 depicts temporal bi-prediction using multiple reference pictures in accordance with the prior art.

To improve temporal prediction accuracy, more recent block-based video coding systems also support multi-hypothesis prediction, where the prediction signal is formed by combining a plurality of prediction signals from different reference pictures. A commonly used form of multi-hypothesis prediction is called bi-prediction, where two prediction signals, each from a picture in a different reference picture list, are combined to form the prediction for the current block. FIG. 4 helps illustrate bi-prediction. Particularly, two reference picture lists, list 0 401 and list 1 403, are used to predict video blocks in the current picture. List 0 contains a total of $N_0$ pictures 404, while list 1 contains a total of $N_1$ pictures 404. In FIG. 4, $ref^{m0}$ from list 0 401 with motion vector (mvx0, mvy0) and $ref^{m1}$ from list 1 403 with motion vector (mvx1, mvy1) are selected to form the bi-prediction of the predicted block 410 of the current picture 412 as in Equation (2):

$$P(x, y) = \frac{P_0(x, y) + P_1(x, y)}{2} = \frac{ref^{m0}(x - mvx_0, y - mvy_0) + ref^{m1}(x - mvx_1, y - mvy_1)}{2} \quad (2)$$

where $P_0(x, y)$ and $P_1(x, y)$ are the first and the second prediction blocks 407 and 408, respectively. A picture or a slice is commonly referred to as a B picture or a B slice, if at least some blocks in the picture or the slice are predicted using bi-prediction (while others may be predicted using uni-prediction). Bi-prediction is supported in all recent video coding standards, such as MPEG2/4, VC1, H.264, and HEVC.

After prediction, the prediction block P(x, y) is subtracted from the original video block at a first summer (see 116 in FIG. 1) to form a prediction residual block. The prediction residual block is transformed at transform unit 104 and quantized at quantization unit 106. The quantized residual transform coefficient blocks are then sent to an entropy coding unit 108 to be entropy coded to further reduce bit rate. The entropy coded residual coefficients are then packed to form part of an output video bitstream 120.

The structure of the reference picture list for a P picture/slice is relatively simple as all blocks are predicted using uni-prediction, meaning only one reference picture list is needed. In a B picture/slice, however, some blocks may be predicted using bi-prediction while others are predicted using uni-prediction. In HEVC, the reference picture lists for bi-prediction, namely, list 0 (or L0) 401 and list 1 (or L1) 403 as in FIG. 4, are the same as in H.264/AVC. However, HEVC differs from H.264/AVC in how the reference picture list for uni-prediction is formed for B pictures/slices. In H.264/AVC, uni-prediction for a video block in a B picture/slice needs to first indicate whether the prediction comes from L0 or from L1, followed by the ref_idx for that particular list. In HEVC, at the 4$^{th}$ JCT-VC meeting, the concept of combined reference picture list was presented [8]. The combined list, referred to as LC in this disclosure, is formed by combining L0 and L1 together; LC then serves as the only reference picture list for all blocks predicted using uni-prediction in a B picture/slice.

Currently in HEVC, by default, the combined list, LC, is formed by taking unique pictures from L0 and L1 in an alternate fashion to ensure minimum redundancy in the combined list. A flow chart of the default combined list generation is given in FIG. 5. Particularly, indices j, and k, into lists L0, L1 and LC, respectively, are initialized at 501, as are the sizes of the two lists L0 and L1. At decision 503, it is determined if all of the reference pictures in L0 have been checked. If not, flow proceeds to decision block 505, in which it is determined if the reference picture at index i in L0 is already in the combined list LC. If not, it is added and the index into combined list LC is incremented (507). Index i also is incremented (509). If, on the other hand, it is already in LC, flow instead proceeds directly from 505 to 509. Next, the essentially identical process is performed in connection with the reference picture at index j in list L1. Specifically, at decision 511, it is determined if all of the reference pictures in L1 have been checked. If not, flow proceeds to decision block 513, in which it is determined if the reference picture at index j in L1 is already in the combined list LC. If not, it is added and the index into LC is incremented (515). Index j into L1 also is incremented (517). If, on the other hand, the reference picture at indeed j in L1 is already in LC, flow instead proceeds directly from 513 to 517. As seen at decision block 519, the process is repeated by alternatively checking the next reference picture in each of lists L0 and L1 until the ends of the two lists are reached.

Figure 5:
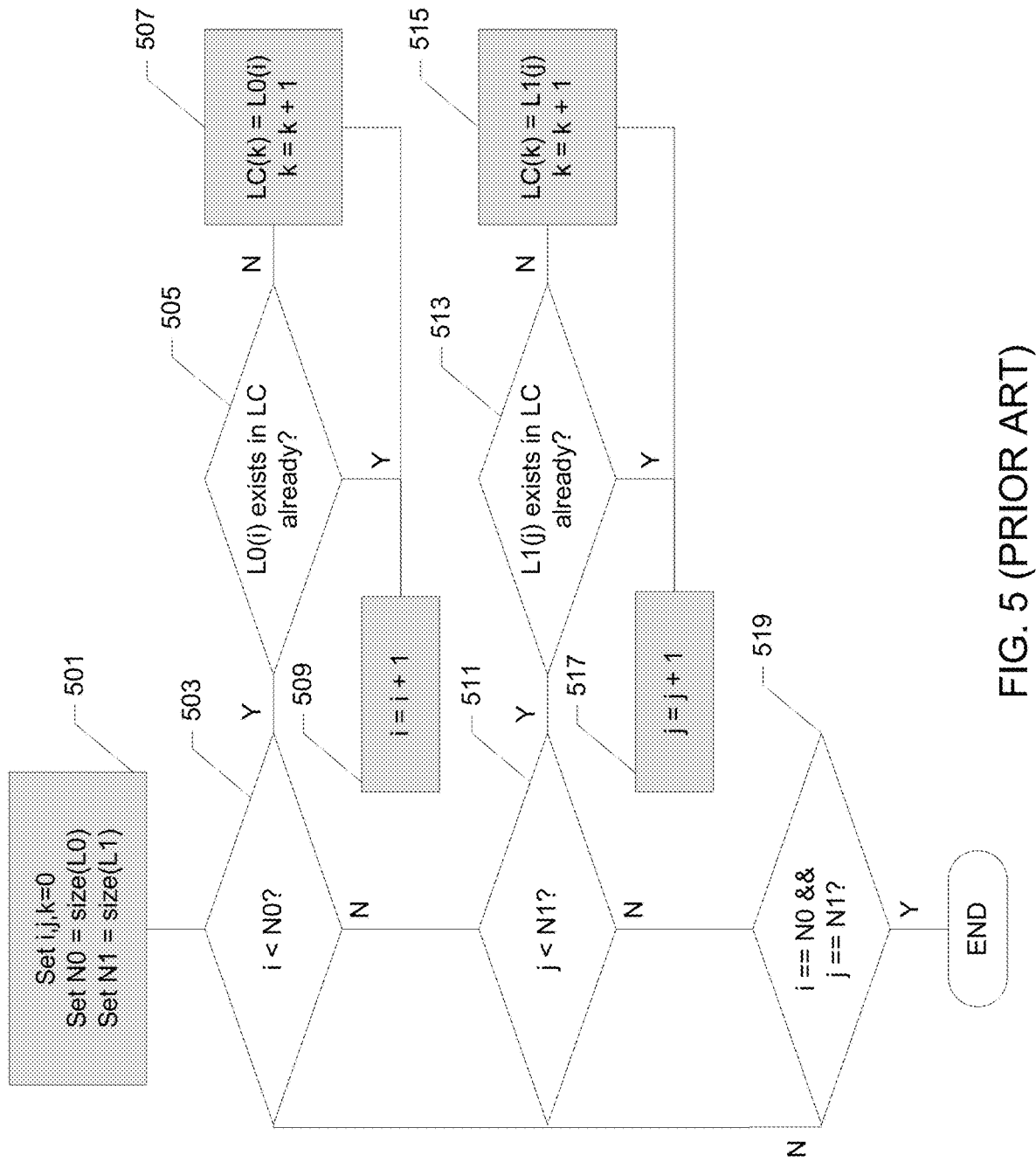
FIG. 5 is a flow chart of a process to construct combined reference picture list in accordance with the prior art.
Figure 6:
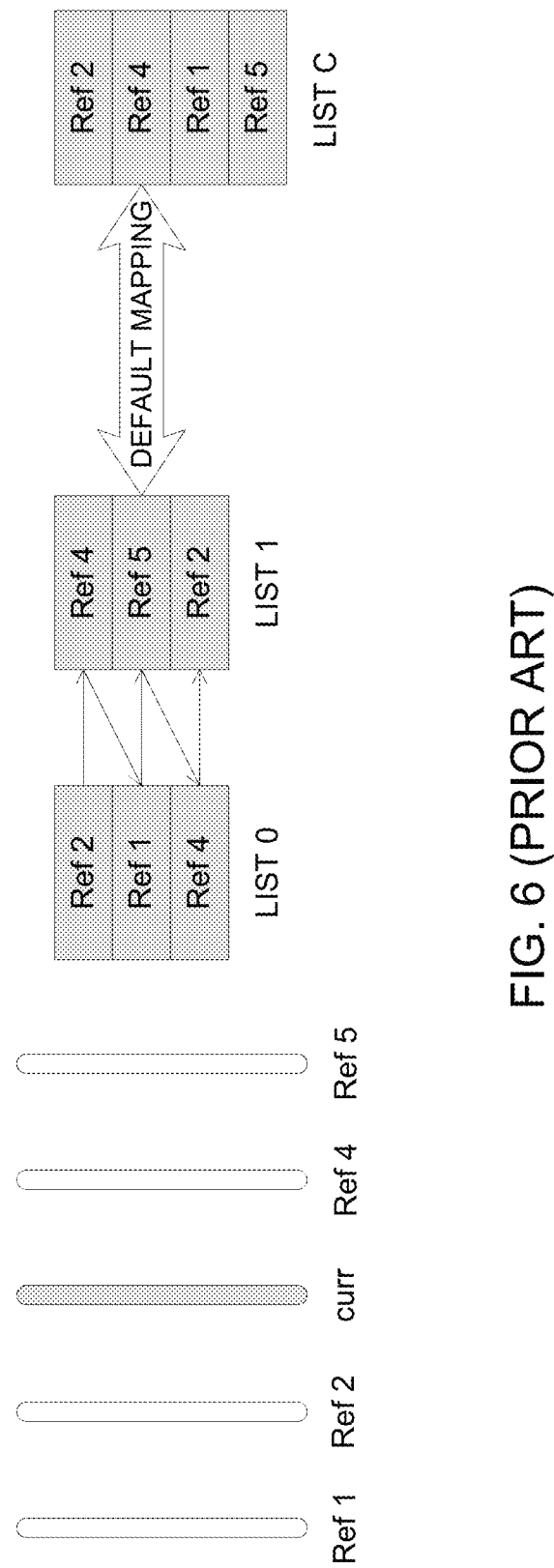
FIG. 6 shows an example of a process to construct combined reference picture list in accordance with the process described in connection with FIG. 5.

An example of combined list LC created by the process illustrated by the flow chart of FIG. 5 is given in FIG. 6. In this example, the current picture that is being coded is temporally between reference pictures 2 and 4. In addition, L0 contains reference pictures Ref 2, Ref 1, and Ref 4 in that order and L1 contains reference pictures Ref 4, Ref 5, and Ref 2 in that order. Following the flow in FIG. 5, the example in FIG. 6 forms the combined list LC by examining, in an alternate fashion, whether each of the three reference pictures in L0 and in L1, respectively, already exists in LC, and adding all previously non-existing reference pictures into LC. As a result, the example in FIG. 6 forms a combined list LC with four reference pictures, by adding to LC, in order, the first reference picture in L0 (Ref 2), the first reference picture in L1 (Ref 4), the second reference picture in L0 (Ref 1), the second reference picture in L1 (Ref 5), skipping the third reference picture in L0 (Ref 4) because it has already been added to LC by virtue of being the same picture as the first reference picture in L1, and skipping the third reference picture in L1 (Ref 2) because it has already been added to LC by virtue of it being the same picture as the first reference picture in L0.

Note that the coding order of the reference pictures in each of the lists L0, L1, and LC in FIG. 6 is different from the display order, as the reference pictures Ref 4 and Ref 5 (later in display order) are coded before the current picture. This default process for constructing LC by ping-ponging between lists L0 and L1 ensures that each entry in LC represents a unique picture in the coded video sequence, hence ensuring minimum redundancy.

Figure 7:
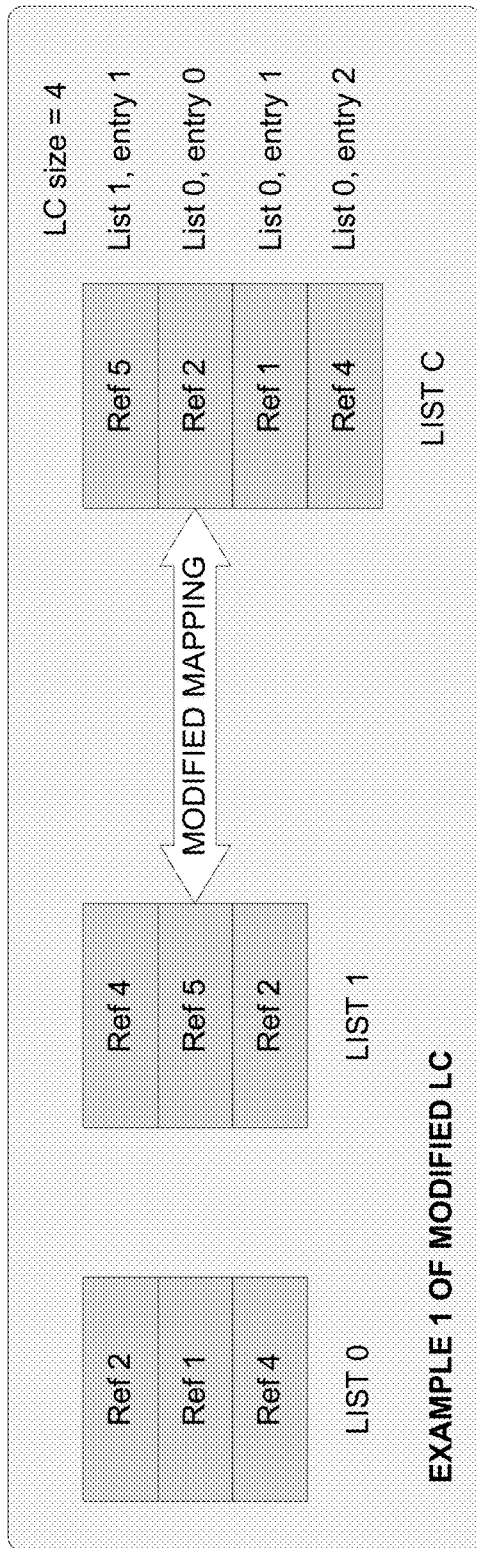
FIG. 7 shows examples of modified process to construct a combined reference picture list in accordance with the prior art.
Figure 7:
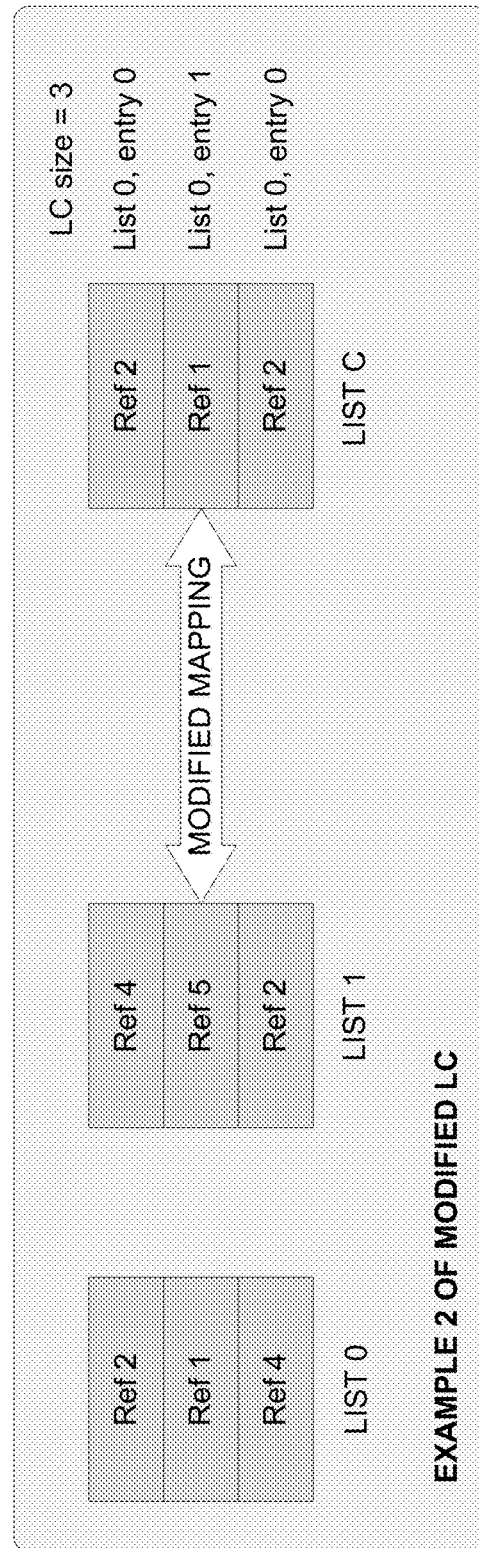

Since the default process does not support reference picture reordering (that is, having a list size different from the default list size, having the entries in the list ordered differently from the default process, repeating some entries in the list, and/or removing some entries from the list, and so on), additional syntax elements are used in HEVC WD5 (see Table 1 below) to support modification process of the combined list LC. FIG. 7 gives two examples of combined list modification, where the first example shows a reordered LC, and the second example shows a LC with repeated entries and a modified LC size (3 entries) different from the default LC size (4 entries). In HEVC WD5, the combined reference picture list LC is signaled using the syntax table in Table 1.

TABLE 1

Reference picture list combination syntax in WD5 [4]

| | Descriptor |
|---|---|
| ref_pic_list_combination( ) { | |
|   if( slice_type % 5 = = 1 ) { // b slice | |
|     ref_pic_list_combination_flag | u(1) |
|     if( ref_pic_list_combination_flag ) { | |
|       num_ref_idx_lc_active_minus1 | ue(v) |
|       ref_pic_list_modification_flag _lc | u(1) |
|       if( ref_pic_list_modification_flag_lc ) | |
|         for ( i =0; i <= | |
|         num_ref_idx_lc_active_minus1; | |
|         i++ ) { | |
|           pic_from_list_0_flag | u(1) |
|           ref_idx_list_curr | ue(v) |
|         } | |
|     } | |
|   } | |
| } | |

Reference picture list combination semantics are as follows:
- ref_pic_list_combination_flag equal to 1 indicates that the reference picture list 0 and the reference picture list 1 are combined to be an additional combined reference picture list used for the blocks or other prediction units that are being uni-predicted. When this flag is equal to 0, it indicates that the reference picture list 0 and reference picture list 1 are identical, and thus reference picture list 0 may be used as the combined reference picture list. The combined reference picture list is set to be empty at the start of the loop defined in Table 1;
- num_ref_idx_lc_active_minus1+1 specifies the number of reference pictures selected from reference picture list 0 or reference picture list 1 in the combined reference picture list;
- ref_pic_list_modification_flag_lc equal to 1 specifies that the syntax element pic_from_list_0_flag and ref_idx_list_curr are present for specifying the mapping for the entries of the combined reference picture list to the entries of reference picture list 0 and reference picture list 1;
- ref_pic_list_modification_flag_lc equal to 0 specifies that these syntax elements are not present. The combined reference picture list is initialized as specified in subclause 8.2.2.4 of HEVC WD 5.
- pic_from_list_0_flag indicates the current reference picture added into the combined reference picture list is from reference picture list 0 or reference picture list 1. When this flag is equal to 1, the picture is from the reference picture list 0, and the CurrRefPicList is reference picture list 0; when this flag is equal to 0, the picture is from the reference picture list 1, and the CurrRefPicList is reference picture list 1;
- ref_idx_list_curr indicates the reference index of the picture in the CurrRefPicList to be appended at the end of the reference picture lists combination.

The reference picture lists L0 and L1 may be modified. To allow flexibility in the use of reference picture lists L0 and L1, both a default construction process and a modified construction process are also supported in HEVC. The current reference picture list construction and modification process for L0 and L1 was presented at the 7th JCT-VC meeting in November 2011[6][7] and adopted into HEVC WD5 [4]. The syntax for reference picture list modification for List 0 and List 1 in HEVC WD5 is given in Table 2 below and represented in flow chart form in FIG. 8.

TABLE 2

Reference picture list modification syntax for List 0 and List 1

| | Descriptor |
|---|---|
| ref_pic_list_modification( ) { | |
|   if( slice_type != 2 ) { // P slice or B slice | |
|     ref_pic_list_modification_flag_l0 | u(1) |
|     if( ref_pic_list_modification_flag_l0 ) | |
|       do { | |
|         list_modification_idc | ue(v) |
|         if( list_modification_idc != 3 ) | |
|           ref_pic_set_idx | ue(v) |
|       } while( list_modification_idc != 3 ) | |
|   } | |
|   if( slice_type = = 1 ) { // B slice | |
|     ref_pic_list_modification_flag_l1 | u(1) |
|     if( ref_pic_list_modification_flag_l1 ) | |
|       do { | |
|         list_modification_idc | ue(v) |
|         if( list_modification_idc != 3 ) | |
|           ref_pic_set_idx | ue(v) |
|       } while( list_modification_idc != 3 ) | |
|   } | |
| } | |

Reference picture list modification semantics are as follows:

The syntax elements list_modification_idc and ref_pic_set_idx specify the change from the initial reference picture lists to the reference picture lists to be used for decoding the slice.

ref_pic_list_modification_flag_l0 equal to 1 specifies that the syntax element list_modification_idc is present for specifying reference picture list 0, while ref_pic_list_modification_flag_l0 equal to 0 specifies that this syntax element is not present. When ref_pic_list_modification_flag_l0 is equal to 1, the number of times that list_modification_idc is not equal to 3 following ref_pic_list_modification_flag_l0 shall not exceed num_ref_idx_l0_active_minus1+1.

ref_pic_list_modification_flag_l1 equal to 1 specifies that the syntax element list_modification_idc is present for specifying reference picture list 1, while ref_pic_list_modification_flag_l1 equal to 0 specifies that this syntax element is not present. When ref_pic_list_modification_flag_l1 is equal to 1, the number of times that list_modification_idc is not equal to 3 following ref_pic_list_modification_flag_l1 shall not exceed num_ref_idx_l1 active minus1+1.

list_modification_idc together with ref_pic_set_idx specifies which of the reference pictures are re-mapped. The values of list_modification_idc are specified in Table 3. The value of the first list_modification_idc that follows immediately after ref_pic_list_modification_flag_l0 or ref_pic_list_modification_flag_l1 shall not be equal to 3.

TABLE 3 list_modification_idc operations for
modification of reference picture lists

| list_modification_idc | modification specified |
|---|---|
| 0 | For list 0: ref_pic_set_idx is present and corresponds to an index to RefPicSetStCurr0; For list 1: ref_pic_set_idx is present and corresponds to an index to RefPicSetStCurr1 |
| 1 | For list 0: ref_pic_set_idx is present and corresponds to an index to RefPicSetStCurr1; For list 1: ref_pic_set_idx is present and corresponds to an index to RefPicSetStCurr0 |
| 2 | ref_pic_set_idx is present and corresponds to an index to RefPicSetLtCurr |
| 3 | End loop for modification of the initial reference picture list | ref_pic_set_idx specifies the index, to RefPicSetStCurr0, RefPicSetStCurr1, or RefPicSetLtCurr, of the reference picture referenced by the current index in the reference picture list. The value of ref_pic_set_idx shall be in the range of 0 to max_num_ref_frames, inclusive.

Figure 8:
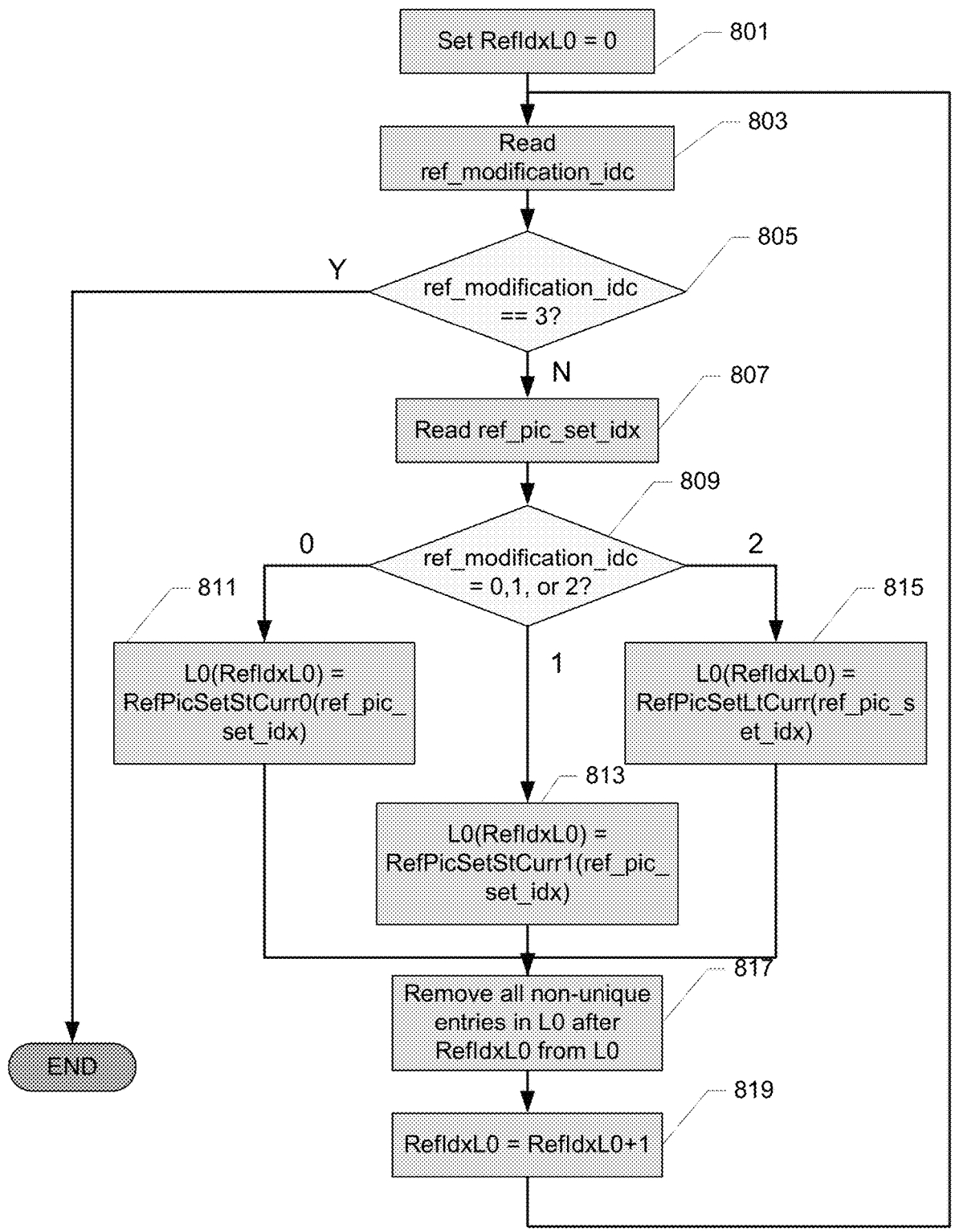
FIG. 8 is a flow chart of reference picture list modification for L0 and L1 in accordance with the prior art, using L0 as an example.

FIG. 8 shows the flow chart of reference picture list modification for L0 and L1, using L0 as an example. The detailed modification process for L0 and L1, including definitions of the reference picture sets (RefPicSetStCurr0, RefPicSetStCurr1, and RefPicSetLtCurr), can be found in the HEVC WD5 [4] and the working draft part of [6][7]. The following defines the reference picture sets in FIG. 8 in simple terms:

RefPicSetStCurr0: short term reference pictures with earlier display order, i.e., before the current picture (e.g., Ref 1 and Ref 2 in FIG. 6)

RefPicSetStCurr1: short term reference pictures with later display order, i.e., after the current picture (e.g., Ref 4 and Ref 5 in FIG. 6)

RefPicSetLtCurr: long term reference pictures (not shown in FIG. 6)

At 801, the index into the list L0 is initiated to zero. At 803, ref_modification_idc is read. Ref_modification_idc may have four values, 0, 1, 2, and 3. A value of 3 indicates that no more modifications are to be performed, and that the modification process may end. (The desired modifications signaled by ref_modification_idc having a value of 0, 1, or 2 are explained below in connection with steps 811, 813, and 815.) Thus, in decision step 805, if ref_modification_idc is set to 3, no more syntax is read. If it is any other value, then, at 807, ref_pic_set_idx is read. This is an index into one of the three sets of pictures in the DPB (i.e., the "before" the current picture being decoded set of pictures, the "after" set of pictures, or the long term set of pictures). (The selection of the particular one of the three sets will occur in steps 811, 813, and 815, as explained further below). In decision step 809, it is determined whether the ref_modification_idc is 0, 1, or 2. If 0, then, at 811, the entry in list L0 at the current index into the list L0, RefIdxL0, is set to the short term reference picture with earlier display order (i.e., RefPicSetStCurr0) that is residing at location ref_pic_set_idc in the set of short term earlier reference pictures in the DPB. If 1 instead, then, at 813, the entry in list L0 at the current index into the list L0, RefIdxL0, is set to the short term reference picture with later display order than the current picture being coded (i.e., RefPicSetStCurr1) that is residing at location ref_pic_set_idc in the set of short term later reference pictures in the DPB. Finally, if 2, then, at 815, the entry in list L0 at the current index into the list L0, RefIdxL0, is set to the long term reference picture (i.e., RefPicSetLtCurr) that is residing at location ref_pic_set_idc in the set of long term reference pictures in the DPB.

In each of the three cases, flow then proceeds to 817, where any entries in list L0 after the entry just modified that refers to the same picture as the entry just modified are removed from L0. At 819, the index into the list L0 is incremented and flow returns to 803. The process continues until ref_modification_idc has a value of 3, indicating no further modifications are to be performed.

Figure 9:
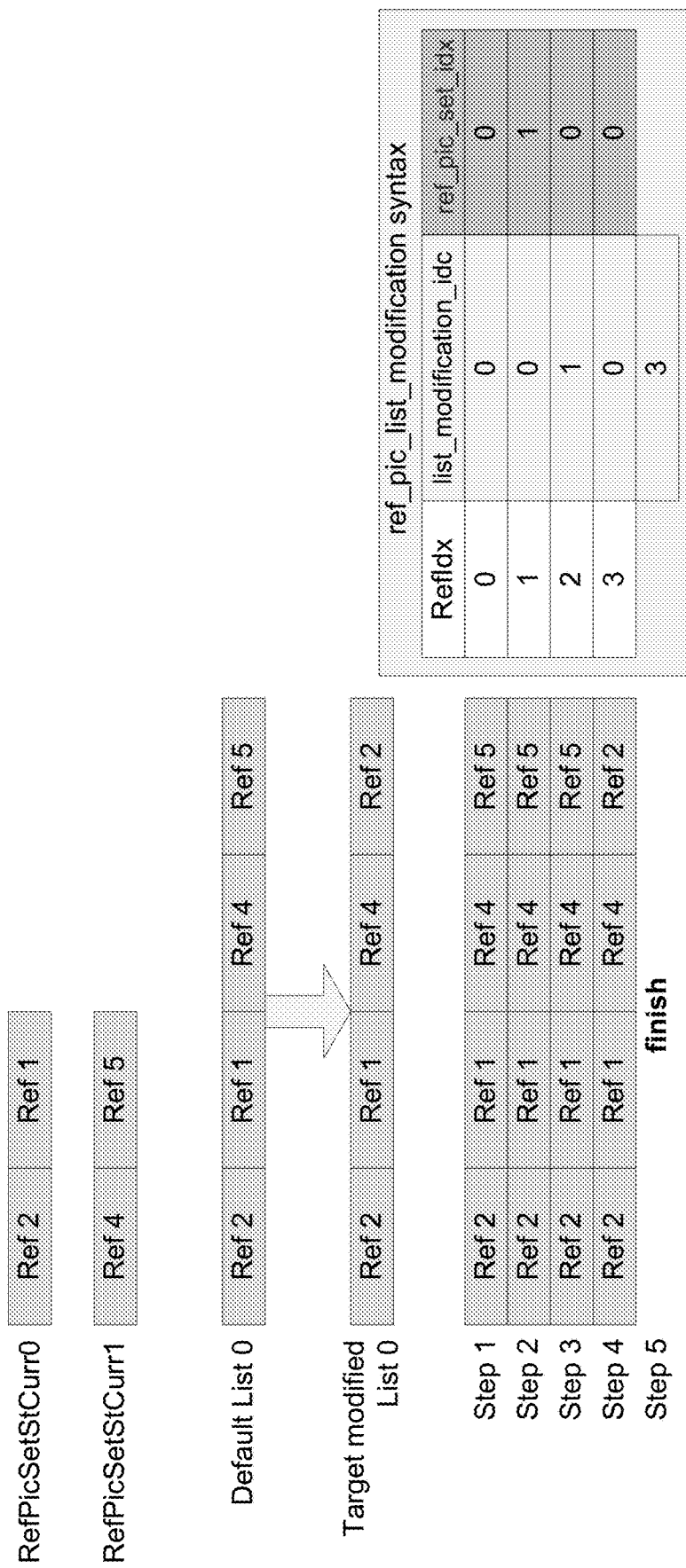
FIG. 9 is an example of ref_pic_list_modification process for L0 in accordance with the process described in connection with FIG. 8.

Again using L0 as an example, FIG. 9 shows the results of the reference picture list modification process outlined by the flowchart of FIG. 8 for a DPB containing (1) reference pictures Ref 2 and Ref 1 (in that order) in the short term earlier set of reference pictures, i.e., RefPicSetStCurr0 and (2) reference pictures Ref 4 and Ref 5 (in that order) in the short term later set of reference pictures, i.e., RefPicSetStCurr1. For simplicity, and without loss of generality, the example in FIG. 9 does not consider RefPicSetLtCurr, which is related to the use of long term reference pictures, and only considers the use of short term reference pictures indicated by RefPicSetStCurr0 and RefPicSetStCurr1.

As shown in FIG. 9, the default list L0 would consist of reference pictures Ref 2, Ref 1, Ref 4, and Ref 5 in that order. In the example of FIG. 9, a simple modification of the last entry in L0 is desired. The process of FIG. 8 requires looping through steps 803 through 819 once for each and every entry in L0, including the first three entries, for which no changes are required and signaling ref_modification_idc and ref_pic_set_idx for each and then further signaling that the process is over by further signaling another ref_modification_idc of value 3. Thus, five steps are used to arrive at the target modified list L0. In each step except the last one, two syntax elements (list_modification_idc and ref_pic_set_idx) are signaled, and an additional variable RefIdx is maintained and incremented.

Furthermore, comparing the process of reference picture list modification for LC (Table 1 above) and for L0/L1 (Table 2 and Table 3 above), note that the modification process for LC in HEVC WD5 is different than for L0 and L1. In particular, the modification process for LC is more straightforward, as each entry in the modified LC is signaled explicitly, rather than signaling two syntax elements (list_modification_idc and ref_pic_set_idx) for each entry in the particular list.

Methods are described herein to unify these list modification processes and to provide a modification process for L0 and L1 that requires less signaling and is more straightforward.

In one embodiment, a method is provided for improved efficiency for the reference picture list combination process. Table 4 shows pseudo-code in accordance with one embodiment of the invention for forming a combined reference picture list. Changes from Table 1 (the pseudo-code for the HEVC WD5 method of forming the combined list LC) are marked with an asterisk.

TABLE 4

Reference picture list combination syntax

| | Descriptor |
|---|---|
| ref_pic_list_combination( ) { | |
|   if( slice_type % 5 = = 1 ) { // b slice | |
|     ref_pic_list_combination_flag | u(1) |
|     if( ref_pic_list_combination_flag ) { | |
|       num_ref_idx_lc_active_minus1 | ue(v) |
|       ref_pic_list_modification_flag_lc | u(1) |
|       if( ref_pic_list_modification_flag_lc ) | |
|         for ( i =0; i <= num_ref_idx_lc_active_minus1; i++ ) { | |
|           pic_from_list_0_flag | u(1) |
| *           if ( ( pic_from_list_0_flag == 1 && | |
|             num_ref_idx_l0_active_minus1 > 0 ) || | |
|           ( pic_from_list_0_flag == 0 && | |
|             num_ref_idx _l1_activie_minus1 > 0 ) | |
|           ref_idx_list_curr | te(v) * |
|         } | |
|     } | |
|   } | |
| } | |

Note that the syntax ref_idx_list_curr is signaled only when L0 (if pic_from_list_0 flag is 1) or L1 (if pic_from_list_1 flag is 0) contains more than 1 entry since nothing needs to be sent if the corresponding list (either L0 or L1) contains only one entry. Thus, the amount of signaling is reduced.

Additionally, instead of using ue(v), te(v) is a more efficient way to signal ref_idx_list_curr, as the entropy coding method te(v) (subclause 9.1 in H.264 [1]) is specifically designed for coding ref_idx-like syntax elements. Ue(v) (known as an Exponential Golomb code) may use three bits to send the value 1. However, te(v) may be used to first determine the number of possible values present in ref_idx_list_curr (by looking at L0 and L1), and if there are only two values, then the syntax element may be sent using one bit. If more are present, then ue(v) may be used.

In other words, if the syntax element is coded as te(v)), the range of possible values for the syntax element is determined first. If the range of possible values for the syntax element is between 0 and 1, then only one bit is used to code the syntax element, thus saving signaling overhead; Otherwise, if the range of the syntax element is between 0 and x, with x being greater than 1, then ue(v) is used to code the syntax element.

Thus, the system makes a determination based on the possible values of ref_idx_list_curr. If there is only one possible value for the syntax element ref_idx_list_curr, then nothing is sent, as this may be determined by both the encoder and decoder based on other values. If there are two possible values for the syntax element ref_idx_list_curr, then one bit is sent. Otherwise, if there are three or more possible values for the syntax element ref_idx_list_curr), then ue(v) is used to code ref_idx_list_cur.

Hence, savings in signaling overhead as compared to HEVC WD5 are realized.

In a further embodiment, a single harmonized reference picture list modification process is disclosed that can be used for modifying L0 and L1. In accordance with this embodiment, the reference picture list modification process for L0 and L1 uses the syntax shown in Table 5. Changes as compared to the pseudo-code of Table 2 (i.e., the reference picture list modification syntax for List 0 and List 1 in HEVC WD5) are marked with an asterisk.

TABLE 5

Reference picture list modification syntax for List 0 and List 1

| | Descriptor |
|---|---|
| ref_pic_list_modification( ) { | |
|   if( slice_type != 2 ) { // P slice or B slice | |
|     ref_pic_list_modification_flag_l0 | u(1) |
|     if( ref_pic_list_modification_flag_l0 ) | |
| *       for ( i =0; i <= | |
|         num_ref_idx_l0_active_minus1; i++ ) { | |
| *         if ( NumRpsCurrTempList > 1 ) | |
| *           ref_pic_set_idx | te(v) * |
|       } | |
|   } | |
|   if( slice_type == 1 ) { // B slice | |
|     ref_pic_list_modification_flag_l1 | u(1) |
|     if( ref_pic_list_modification_flag_l1 ) | |
| *       for ( i =0; i <= | |
|         num_ref_idx_l1_active_minus1; i++ ) { | |
| *         if (NumRpsCurrTempList > 1 ) | |
| *           ref_pic_set_idx | te(v) * |
|       } | |
|   } | |
| } | |

Reference picture list modification semantics are as follows:

The syntax element ref_pic_set_idx is used to specify the change from the initial reference picture list to the modified reference picture list.

ref_pic_list_modification_flag_l0 equal to 1 specifies that the syntax element ref_pic_set_idx is present for specifying reference picture list 0. ref_pic_list_modification_flag_l0 equal to 0 specifies that this syntax element is not present.

ref_pic_list_modification_flag_l1 equal to 1 specifies that the syntax element ref_pic_set_idx is present for specifying reference picture list 1. ref_pic_list_modification_flag_l1 equal to 0 specifies that this syntax element is not present.

ref_pic_set_idx specifies the index of the picture in RefPicSetCurrTempListX to be placed at the current position of reference picture list LX (where X is 0 if relating to list L0 and X is 1 if relating to list L1). The syntax ref_pic_set_idx shall be in the range of 0 to max_num_ref_frames−1 in the list LX, inclusive. If the syntax element ref_pic_set_idx is not present, it is set to 0.

The new process reduces signaling substantially in some cases (and, in practice, probably in most cases). Stated simply, instead of signaling for each entry in the list the type of modification to be performed and the index into the DPB of the reference picture to be used, as in the syntax of Table 2 and the flowchart of FIG. 8, the inventive process signals only the index into the DPB and does not require an additional signal to denote the end of the list modification process.

The process disclosed in Table 5 above involves the use of the intermediate list of reference pictures for each of L0 and/or L1, RefPicSetCurrTempListX, where the X represents 0 or 1 depending on which modified list is being considered. In this scheme, a revised initialization process for reference picture lists is provided. This initialization process is invoked when decoding a P or B slice header. When decoding a P or B slice, there may be at least one reference picture in RefPicSetStCurr0, RefPicSetStCurr1 or RefPicSetLtCurr.

The following procedure is conducted to construct RefPicSetCurrTempList0:
cIdx=0
NumRpsCurrTempList=NumRpsStCurr0+NumRpsStCurr1+NumRpsLtCurr
for (i=0; i<NumRpsStCurr0; cIdx++, i++)
  RefPicSetCurrTempList0 [cIdx]=RefPicSetStCurr0[i]
for (i=0; i<NumRpsStCurr1; cIdx++, i++)
  RefPicSetCurrTempList0 [cIdx]=RefPicSetStCurr1[i]
for (i=0; i<NumRpsLtCurr; cIdx++, i++)
  RefPicSetCurrTempList0 [cIdx]=RefPicSetLtCurr[i]

If ref_pic_list_modification_flag_l0 is 0, then no modifications from the default list L0 will be performed and the default RefPicList0 is constructed by taking the first num_ref_idx_l0_active_minus1+1 entries in RefPicSetCurrTempList0 in order. If, on the other hand, ref_pic_list_modification_flag_l0 is 1, the process of Table 5 for modification of reference picture list L0 is invoked with RefPicSetCurrTempList0 and num_ref_idx_l0_active_minus1 as inputs, and RefPicList0 (L0) as the output.

Briefly, the above pseudo-code determines the number of reference pictures in the DPB (i.e., NumRpsCurrTempList) by summing the numbers of before, after and long term pictures and then places them in order with the before pictures first (in order by closest temporal distance to furthest temporal distance from the current picture), followed by the after pictures (also in order by closest temporal distance to furthest temporal distance from the current picture), followed by the long term reference pictures.

The following procedure is implemented to construct RefPicSetCurrTempList1:
cIdx=0
NumRpsCurrTempList=NumRpsStCurr0+NumRpsStCurr1+NumRpsLtCurr
for (i=0; i<NumRpsStCurr1; cIdx++, i++)
  RefPicSetCurrTempList1 [cIdx]=RefPicSetCurr1[i]
for (i=0; i<NumRpsStCurr0; cIdx++, i++)
  RefPicSetCurrTempList1 [cIdx]=RefPicSetCurr0[i]
for (i=0; i<NumRpsLtCurr; cIdx++, i++)
  RefPicSetCurrTempList1 [cIdx]=RefPicSetLtCurr[i]

If ref_pic_list_modification_flag_l1 is 0, then no modifications from the default list L1 will be performed and the default RefPicList1 is constructed by taking the first num_ref_idx_l1_active_minus1+1 entries in RefPicSetCurrTempList1 in order. If, on the other hand, ref_pic_list_modification_flag_l1 is 1, the modification process of Table 5 for modification of reference picture list L1 is invoked with RefPicSetCurrTempList1 and num_ref_idx_l1_active_minus1 as input, and RefPicList1 as output.

Briefly, the above pseudo-code determines the number of reference pictures in the DPB (i.e., NumRpsCurrTempList) by summing the numbers of before, after and long term pictures and then places them in order with the after pictures first (in order by closest temporal distance to furthest temporal distance from the current picture), followed by the before pictures (also in order by closest temporal distance to furthest temporal distance from the current picture), followed by the long term reference pictures.

Note that, the creation of the two lists RpsCurrTempLX is beneficial even in those cases where no modifications will be made to the reference picture lists L0 and L1 because, in such cases, the reference picture lists L0 and L1 can be created very simply by just taking the first few entries in the RpsCurrTempLX since they are already in the default order for lists L0 and L1, respectively.

The modification process for reference picture lists as reflected in Table 5 accepts as inputs the aforementioned array of reference pictures, RefPicSetCurrTempLX, and the size of the reference picture list, num_ref_idx_lX_active_minus1 (with X being 0 or 1, depending on which list is being modified). The output of this process is an array containing the modified reference picture list RefPicListX.

Figure 10:
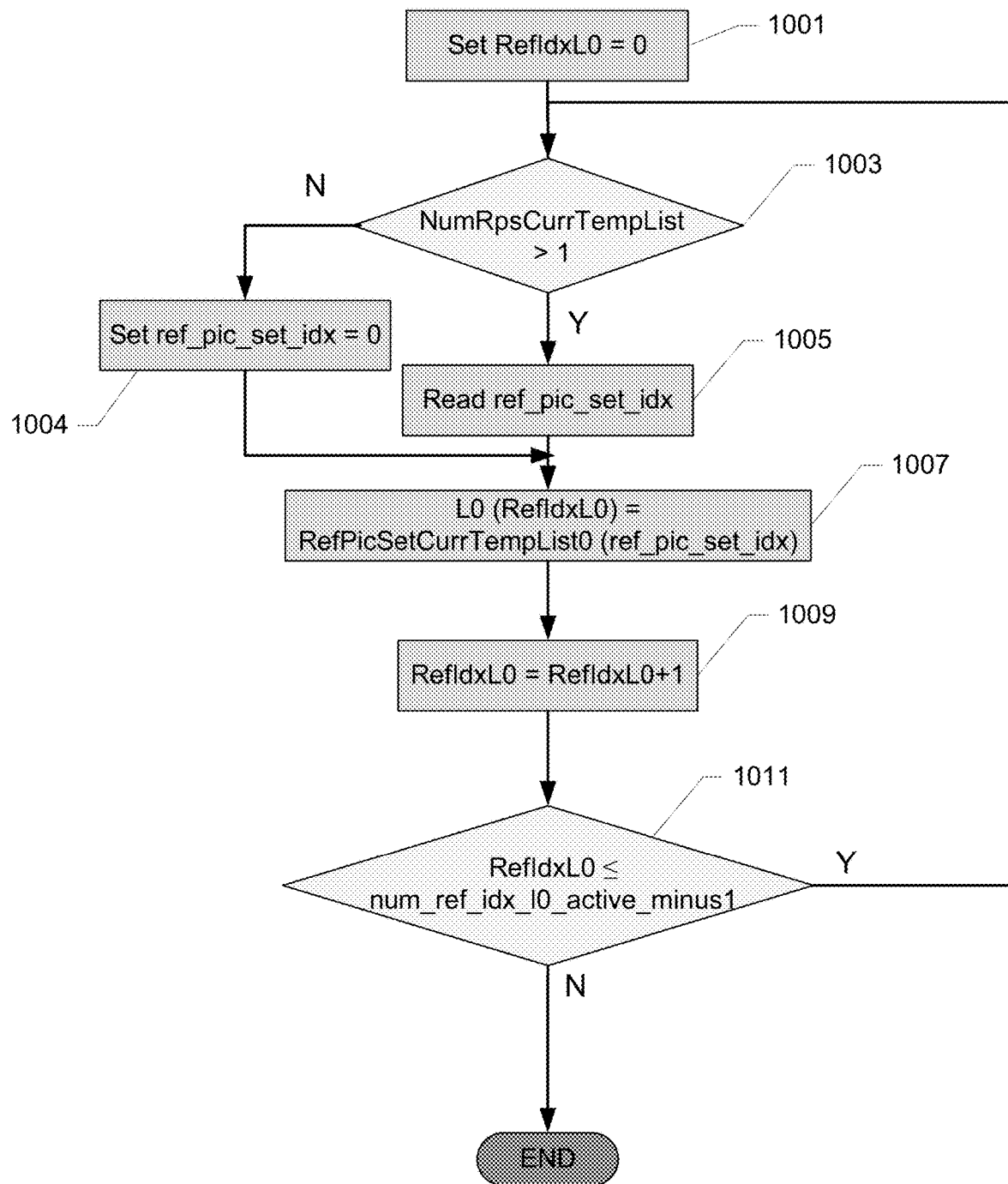
FIG. 10 is a flow chart of reference picture list modification, using L0 as an example, in accordance with an embodiment of the present invention.

FIG. 10 is a flowchart illustrating the list modification process from Table 5 for exemplary list L0. The process would be similar for list L1. The index into the list L0 is initialized to zero at 1001. At 1003, it is determined if the temporary list RefPicSetCurrTempL0 contains more than one entry since the signaling of ref_pic_set_idx is not necessary if the list contains only a single entry. If the list contains only one entry, flow proceeds to 1004, where ref_pic_set_idx is not signaled and is instead set to 0 by default. Otherwise, flow proceeds to 1005, where the index, ref_pic_set_idx, into the intermediate list RefPicSetCurrTempList0 is read. At 1007, the entry in the modified list L0 at the current index is set to the value in the RefPicSetCurrTempList0 list located at the signaled index location ref_pic_set_idx. Then, the index into the modified list L0 is incremented (1009). At 1011, it is determined if the end of L0 has been reached. If not, flow returns to 1003. If so, the process ends.

As previously noted, if no modification of a list is desired, then the process of FIG. 10 is not performed and the first num_ref_idx_lX_active_minus1+1 entries of RefPicSetCurrTempListX simply become the corresponding list LX.

Figure 11:
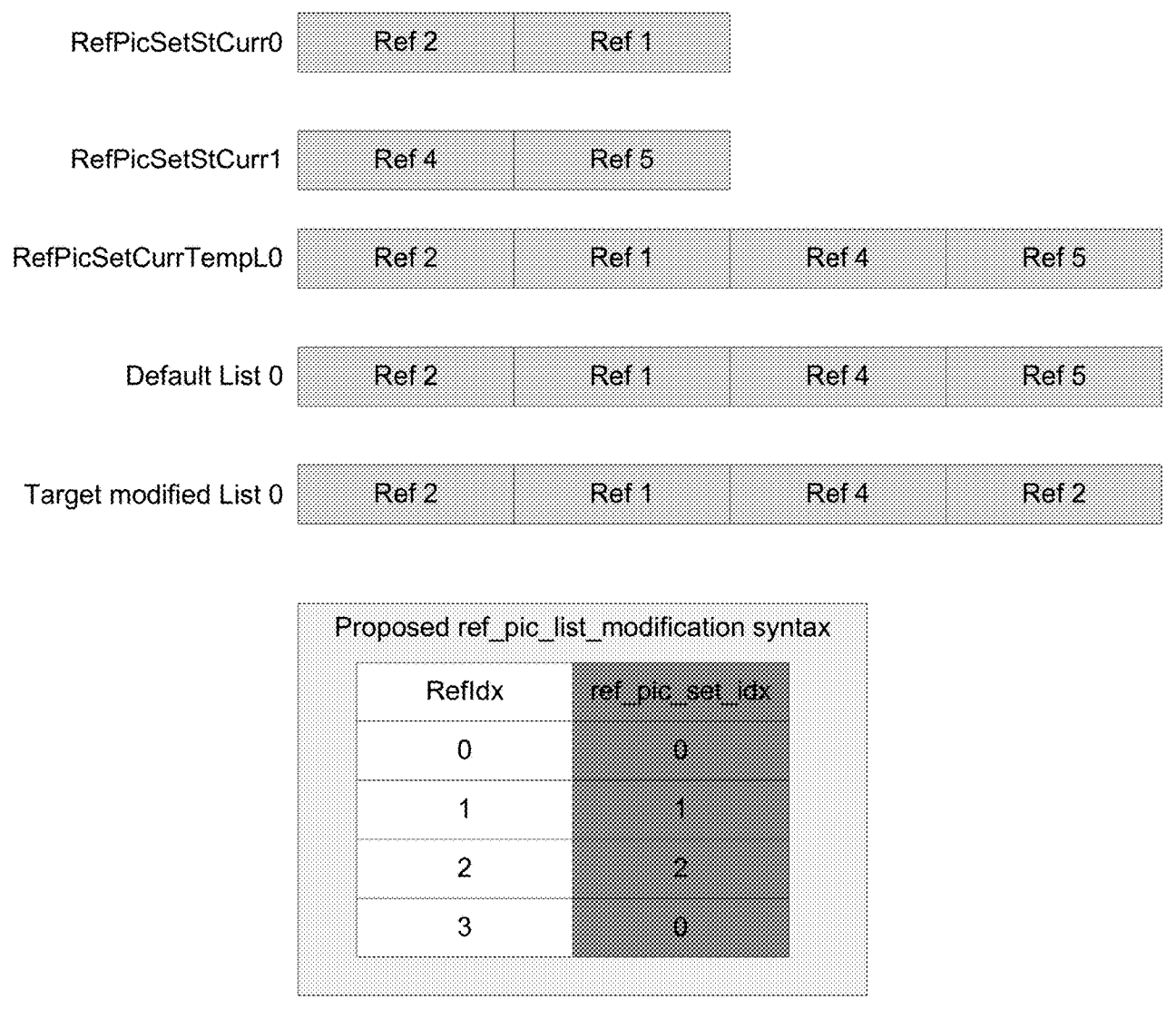

FIG. 11 shows how the proposed reference picture list scheme works for the same example as in FIG. 9. Comparing FIG. 11 to FIG. 9, the modification process of FIG. 11 uses half the number of syntax elements as in FIG. 9, i.e., only ref_pic_set_idx is signaled for each entry in the list L0, rather than ref_pic_set_idx and list_modification_idc. Furthermore, the process as illustrated in the flowchart of FIG. 10 is more straightforward than the process of the flowchart of FIG. 8 in the sense that it explicitly signals each entry in the list, and does not need the complicated process in FIG. 8.

The systems and methods described herein are well suited for communications of video streams over both wired and wireless networks. Wired networks are well known. An overview of various types of wireless devices and infrastructure is provided with respect to FIGS. 12A-12E, where various elements of the network may utilize the systems and methods described herein. More specifically, base stations such as base transceiver station (BTS), a Node-B, an eNode B, a Home Node B, a Home eNode B, a site controller, an access point (AP), a wireless router, a media aware network element (MANE), as well as a wireless transmit/receive units (WTRUs) may generate and/or process the signaling described above to convey coded video data from one entity to another.

Figure 12A:
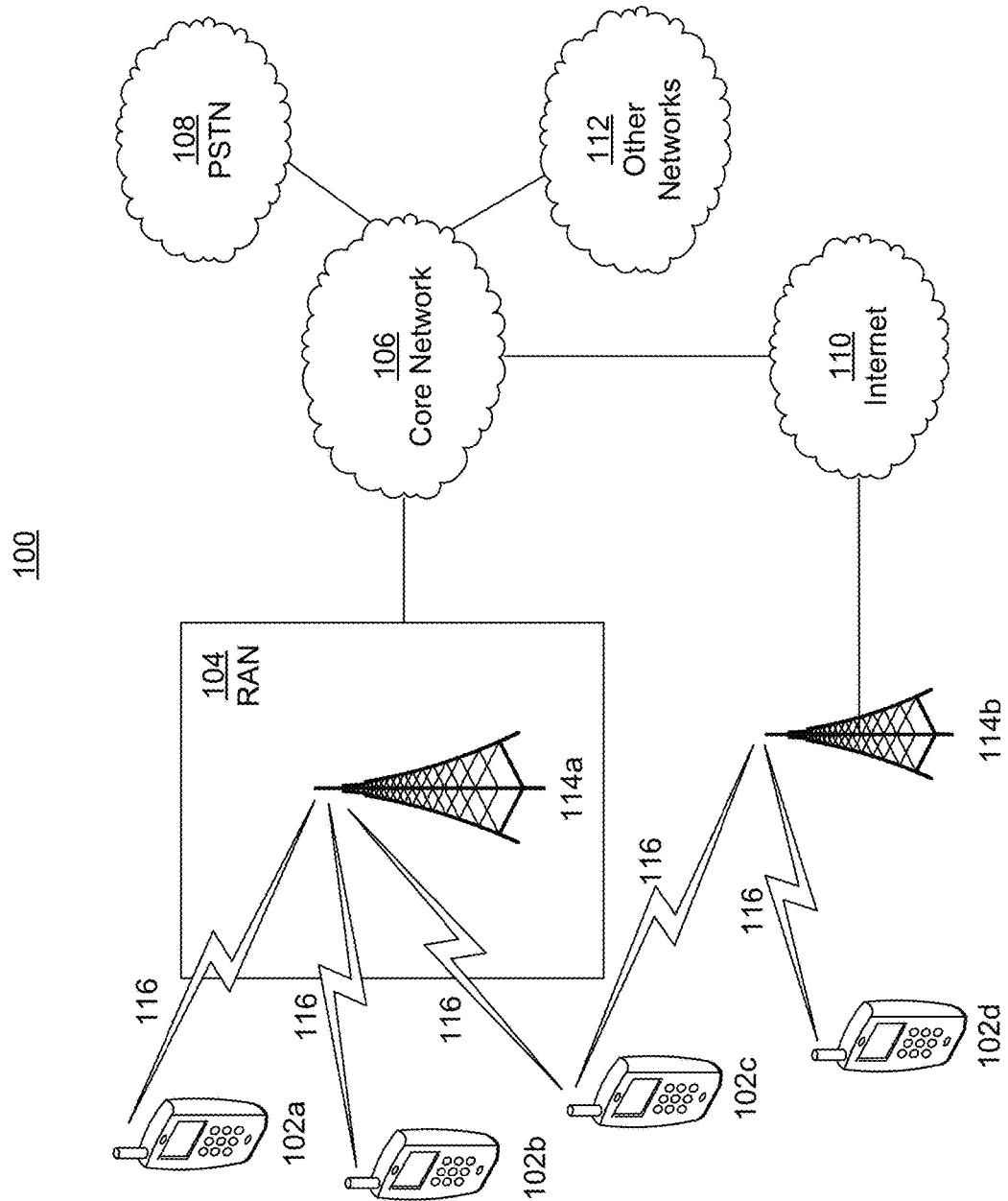
FIG. 12A is a system diagram of an example communications system in which one or more disclosed embodiments may be implemented.

FIG. 12A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 12A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 12A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 12A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 12A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 12A may be configured to communicate with the base station 114a, which may employ a cellular-based radio technology, and with the base station 114b, which may employ an IEEE 802 radio technology.

Figure 12B:
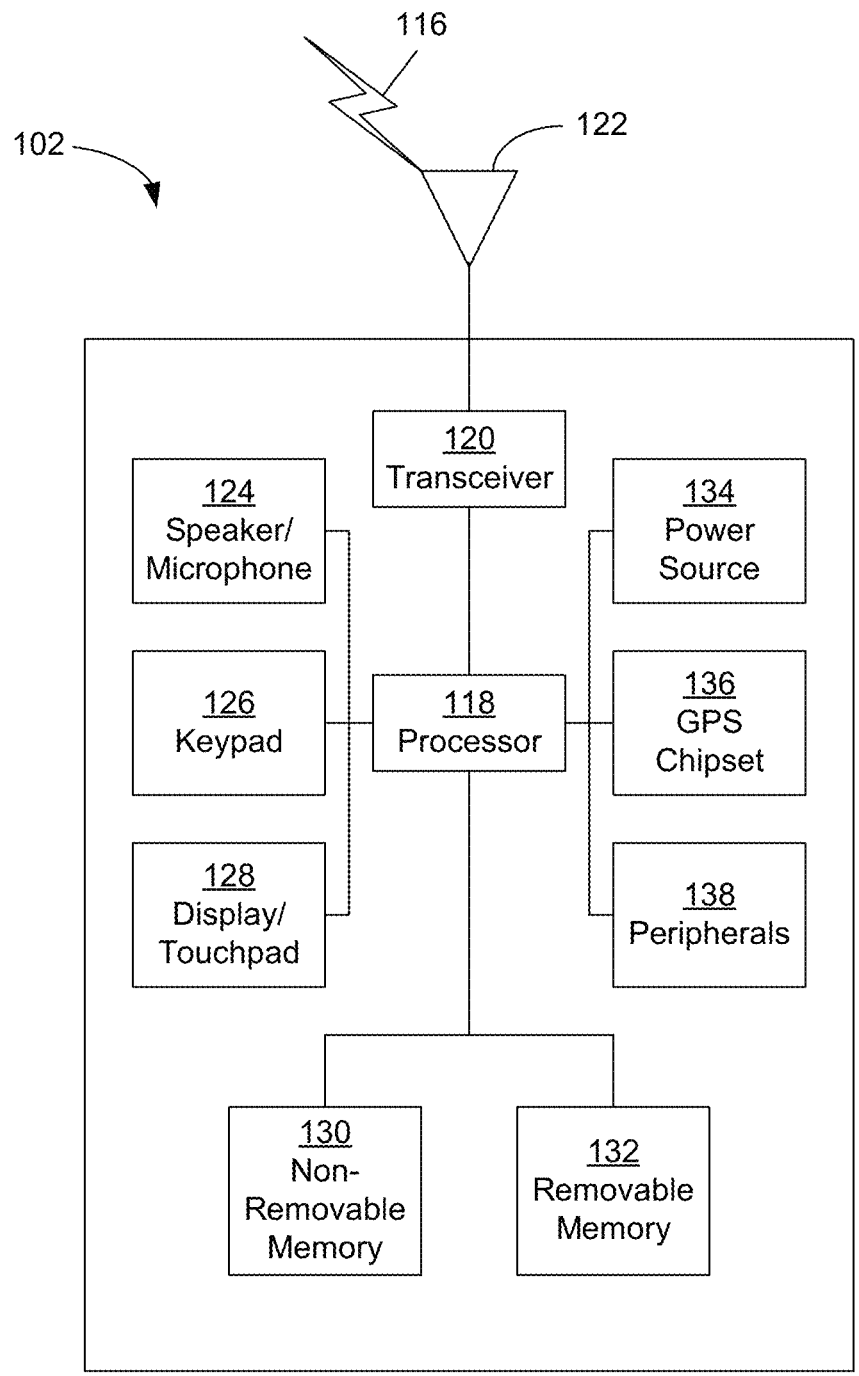
FIG. 12B is a system diagram of an example wireless transmit/receive unit (WTRU) that may be used within the communications system illustrated in FIG. 12A; and, FIGS. 12C, 12D, and 12E are system diagrams of example radio access networks and example core networks that may be used within the communications system illustrated in FIG. 12A.

FIG. 12B is a system diagram of an example WTRU 102. As shown in FIG. 12B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 12B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 12B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 12C:
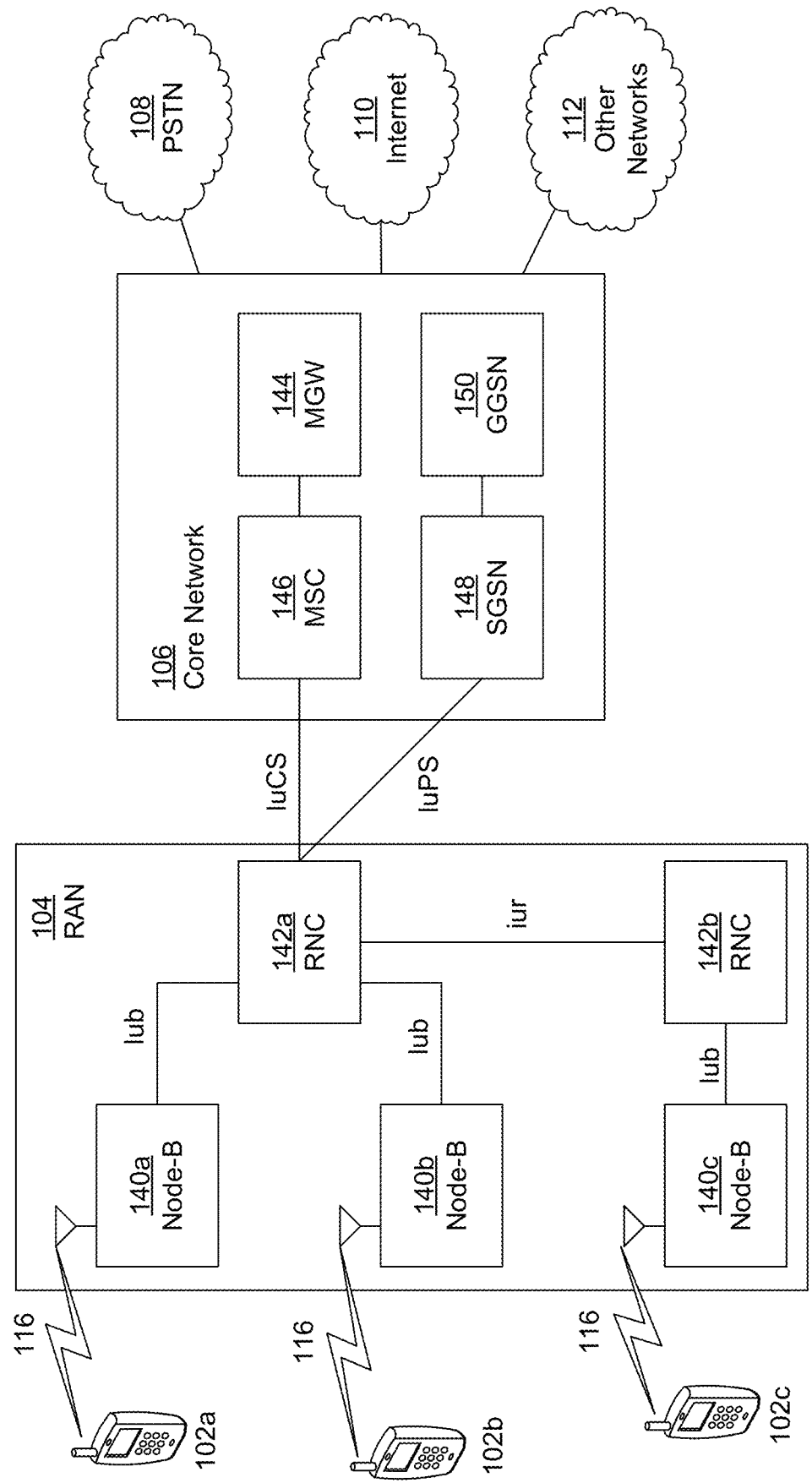

FIG. 12C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 12C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 12C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 12C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 12D:
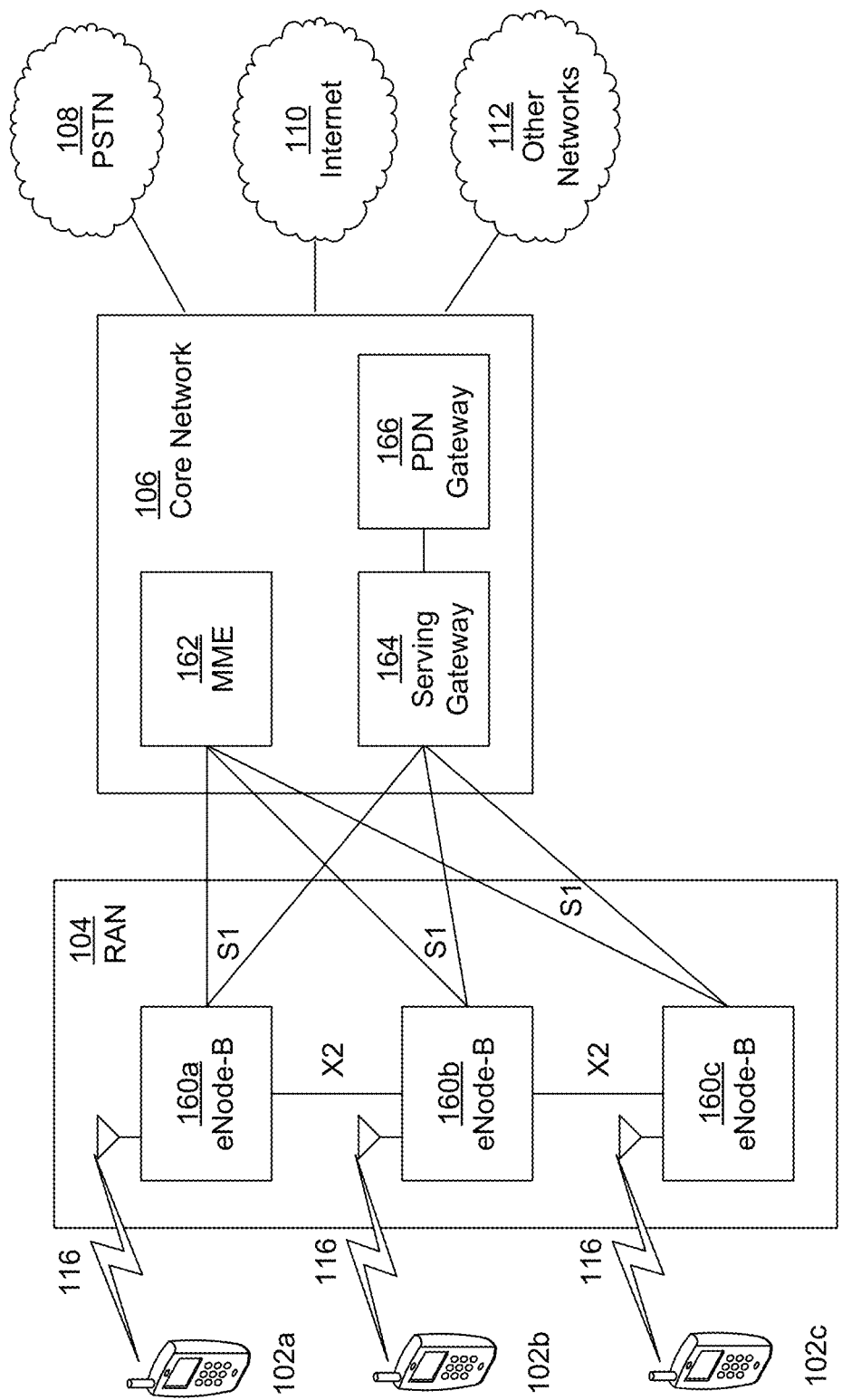

FIG. 12D is a system diagram of the RAN 104 and the core network 106 according to another embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 12D, the eNode-Bs 160a, 160b, 160c may communicate with one another over an X2 interface.

The core network 106 shown in FIG. 12D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 12E:
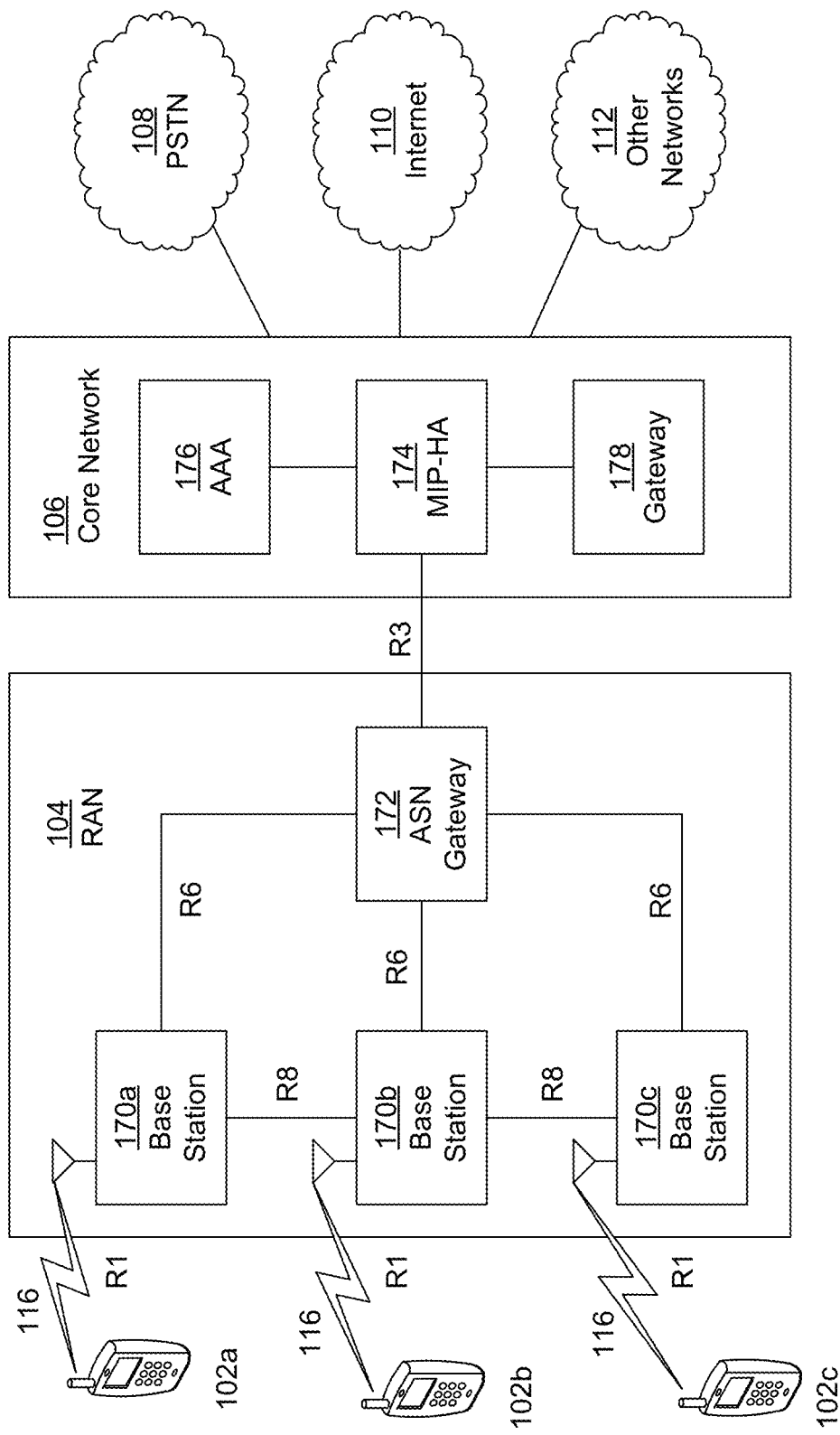

FIG. 12E is a system diagram of the RAN 104 and the core network 106 according to another embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 12E, the RAN 104 may include base stations 170a, 170b, 170c, and an ASN gateway 172, though it will be appreciated that the RAN 104 may include any number of base stations and ASN gateways while remaining consistent with an embodiment. The base stations 170a, 170b, 170c may each be associated with a particular cell (not shown) in the RAN 104 and may each include one or more transceivers for communicating with the WTRUs 102a, 102b, 102c over the air interface 116. In one embodiment, the base stations 170a, 170b, 170c may implement MIMO technology. Thus, the base station 170a, for example, may use multiple antennas to transmit wireless signals to, and receive wireless signals from, the WTRU 102a. The base stations 170a, 170b, 170c may also provide mobility management functions, such as handoff triggering, tunnel establishment, radio resource management, traffic classification, quality of service (QoS) policy enforcement, and the like. The ASN gateway 172 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 170a, 170b, 170c may be defined as an R8 reference point that includes protocols for facilitating WTRU handovers and the transfer of data between base stations. The communication link between the base stations 170a, 170b, 170c and the ASN gateway 172 may be defined as an R6 reference point. The R6 reference point may include protocols for facilitating mobility management based on mobility events associated with each of the WTRUs 102a, 102b, 102c.

As shown in FIG. 12E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 174, an authentication, authorization, accounting (AAA) server 176, and a gateway 178. While each of the foregoing elements are depicted as part of the core network 106, it will be appreciated that any one of these elements may be owned and/or operated by an entity other than the core network operator.

The MIP-HA 174 may be responsible for IP address management, and may enable the WTRUs 102a, 102b, 102c to roam between different ASNs and/or different core networks. The MIP-HA 174 may provide the WTRUs 102a, 102b, 102c with access to packet-switched networks, such as the Internet 110, to facilitate communications between the WTRUs 102a, 102b, 102c and IP-enabled devices. The AAA server 176 may be responsible for user authentication and for supporting user services. The gateway 178 may facilitate interworking with other networks. For example, the gateway 178 may provide the WTRUs 102a, 102b, 102c with access to circuit-switched networks, such as the PSTN 108, to facilitate communications between the WTRUs 102a, 102b, 102c and traditional land-line communications devices. In addition, the gateway 178 may provide the WTRUs 102a, 102b, 102c with access to the networks 112, which may include other wired or wireless networks that are owned and/or operated by other service providers.

Although not shown in FIG. 12E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

EMBODIMENTS

In one embodiment, a method is implemented of generating reference picture lists L0 and L1 for decoding a predicted picture within video data, the method comprising: generating a first ordered list of reference pictures from a decoded picture buffer (DPB), RefPicSetCurrTempList0, in which the list is ordered with the reference pictures in the DPB that are temporally before the current picture, if any, listed in order by temporal distance from the current picture, followed by the reference pictures in the DPB that are temporally later than the current picture, if any, listed in order by temporal distance from the current picture, followed by long term reference pictures in the DPB, if any, listed in the order in which they are stored in the DPB; generating a second ordered list of reference pictures from the DPB, RefPicSetCurrTempList1, in which the list is ordered with the reference pictures in the DPB that are temporally later than the current picture, if any, listed first in order by temporal distance from the current picture, followed by the reference pictures in the DPB that are temporally before the current picture, if any, listed in order by temporal distance from the current picture, followed by long term reference pictures in the DPB, if any, listed in the order in which they are stored in the DPB; and generating at least one of lists L0 and L1 by selecting reference pictures from RefPicSetCurrTempList0 and RefPicSetCurrTempList1, respectively.

In accordance with this embodiment, the method may further comprise: determining if either of lists L0 and L1 are to be modified lists, wherein; if list L0 is to be a modified list, then generating list L0 comprises, for each reference picture in reference picture list L0, receiving a first index into the first ordered list and listing the reference picture identified at that index in the first ordered list at the corresponding entry in L0; and, if list L1 is to be a modified list, then generating list L1 comprises, for each reference picture entry in reference picture list L1, receiving a second index into the second ordered list and listing the reference picture identified at that index in the second ordered list at the corresponding entry in L1.

One or more of the preceding embodiments may further comprise, if list L0 is not to be a modified list, then generating list L0 comprises taking entries from RefPicSetCurrTempList0 in order up to a first specified number of entries; and, if list L1 is not to be a modified list, then generating list L1 comprises taking entries from RefPicSetCurrTempList1 in order up to a second specified number of entries.

One or more of the preceding embodiments may further comprise wherein the determining comprises reading syntax element ref_pic_list_modification_flag_10 with respect to list L0 and syntax element ref_pic_list_modification_flag_11 with respect to list L1.

One or more of the preceding embodiments may further comprise wherein the first index and the second index are in the range of zero to the number of pictures in the DPB.

One or more of the preceding embodiments may further comprise wherein a syntax element ref_pic_set_idx is used to specify the first index and the second index.

One or more of the preceding embodiments may further comprise: reading a syntax element, ref_pic_list_modification_flag_11, wherein ref_pic_list_modification_flag_11 equal to a first value specifies that the syntax element ref_pic_set_idx is present for specifying L1 and wherein ref_pic_list_modification_flag_11 equal to a second value specifies that this syntax element is not present for specifying L1.

One or more of the preceding embodiments may further comprise: reading a syntax element, ref_pic_list_modification_flag_10, wherein ref_pic_list_modification_flag_10 equal to a first value specifies that the syntax element ref_pic_set_idx is present for specifying L0 and wherein ref_pic_list_modification_flag_10 equal to a second value specifies that this syntax element is not present for specifying L0.

One or more of the preceding embodiments may further comprise: reading a syntax element, ref_pic_list_modification_flag_11, wherein ref_pic_list_modification_flag_11 equal to a first value specifies that the syntax element ref_pic_set_idx is present for specifying L1 and wherein ref_pic_list_modification_flag_11 equal to a second value specifies that this syntax element is not present for specifying L1.

One or more of the preceding embodiments may further comprise: wherein, if the first index is not present, it is set to zero, and, if the second index is not present, it is set to zero.

In another embodiment or in connection with any of the preceding described embodiments, a method for initializing a decoder for reference picture lists for decoding a P or B slice header may comprise:
constructing a first temporary list, RefPicSetCurrTempList0, by:
cIdx=0
NumRpsCurrTempList=NumRpsStCurr0+NumRpsStCurr1+NumRpsLtCurr
for (i=0; i<NumRpsStCurr0; cIdx++, i++)
RefPicSetCurrTempList0 [cIdx]=RefPicSetStCurr0 [i]
for (i=0; i<NumRpsStCurr1; cIdx++, i++)
RefPicSetCurrTempList0 [cIdx]=RefPicSetStCurr1 [i]
for (i=0; i<NumRpsLtCurr; cIdx++, i++)
RefPicSetCurrTempList0 [cIdx]=RefPicSetLtCurr [i].

One or more of the preceding embodiments may further comprise constructing a list, L0 (RefPicList0), if a flag, ref_pic_list_mollification_flag_10, is 0, by taking the first num_ref_idx_10_active_minus1+1 entries in RefPicSetCurrTempList0.

One or more of the preceding embodiments may further comprise constructing list L0, if the flag, ref_pic_list_modification_flag_10, is 1, by invoking a modification of picture lists process with RefPicSetCurrTempList0 and num_ref_idx_10_active_minus1 as inputs.

One or more of the preceding embodiments may further comprise, if decoding a B slice header:
constructing a second temporary list, RefPicSetCurrTempList1 by:
cIdx=0
NumRpsCurrTempList=NumRpsStCurr0+NumRpsStCurr1+NumRpsLtCurr
for (i=0; i<NumRpsCurr1; cIdx++, i++)
RefPicSetCurrTempList1 [cIdx]=RefPicSetCurr1[i]
for (i=0; i<NumRpsCurr0; cIdx++, i++)
RefPicSetCurrTempList1 [cIdx]=RefPicSetCurr0[i]
for (i=0; i<NumRpsLtCurr; cIdx++, i++)
RefPicSetCurrTempList1 [cIdx]=RefPicSetLtCurr[i].

One or more of the preceding embodiments may further comprise constructing a list, L1 (RefPicList1), if a flag (ref_pic_list_mollification_flag_11) is 0 by taking the first num_ref_idx_11_active_minus1+1 entries in RefPicSetCurrTempList1.

One or more of the preceding embodiments may further comprise constructing list L1 (RefPicList1), if the flag (ref_pic_list_modification_flag_11) is 1 by invoking a reference picture list modification process with RefPicSetCurrTempList1 and num_ref_idx_11_active_minus1 as inputs.

One or more of the preceding embodiments may further comprise wherein the reference picture list modification process is used to generate RefPicListX, wherein X designates the corresponding list 0 or 1, wherein:
set refIdxLX as an index into the reference picture list RefPicListLX; and
iteratively repeat until refIdxLX is greater than num_ref_idx_1X_active_minus1+1:
RefPicListX [refIdxLX++]=RefPicSetCurrTempLX [ref_pic_set_idx].

In another embodiment or in connection with any of the preceding described embodiments, a method of signaling modifications to a plurality of reference picture lists may comprise signaling the modifications to the plurality of reference picture lists using a unified signaling syntax.

One or more of the preceding embodiments may further comprise wherein the plurality of reference picture lists includes L0, L1, and a combined list, LC.

One or more of the preceding embodiments may further comprise wherein the unified signaling syntax includes coding an index of a reference picture using an entropy coding method.

One or more of the preceding embodiments may further comprise wherein the unified signaling syntax includes coding the index of a reference picture using te(v).

In another embodiment or in connection with any of the preceding described embodiments, a method may comprise: determining a number of entries in a reference picture list; generating a message including a value identifying an entry in the reference picture list, wherein the value is represented by a single bit if the number of entries in the reference picture list is two, the value is represented by multiple bits if the number of entries in the reference picture list is three or more, and the message omits the value if the number of entries in the reference picture list is one.

One or more of the preceding embodiments may further comprise wherein the value is ue(v) when the number of entries is three or more values.

One or more of the preceding embodiments may further comprise wherein the index is specified by the syntax element ref_idx_list_curr.

In another embodiment or in connection with any of the preceding described embodiments, a method of creating a combined list, LC, of reference pictures to be used for decoding a B slice from a first list of reference pictures, L0, and a second list of reference pictures, L1, may comprise: determining if L0 contains more than one entry; determining if L1 contains more than one entry; if either L0 or L1 contains more than one entry, using a syntax element ref_idx_list_curr to indicate entries in at least one of L0 and L1 to be added into LC; if L0 contains only one entry, setting ref_idx_list_curr to 0; if L1 contains only one entry, setting ref_idx_list_curr to 0; and creating LC using the value of ref_idx_list_curr.

One or more of the preceding embodiments may further comprise: wherein the determining if L0 contains more than one entry comprises determining if a syntax element num_ref_idx_10_active_minus1 is zero or more and the determining if L1 contains more than one entry comprises determining if a syntax element num_ref_idx_11_ active_minus1 is zero or more.

CONCLUSION

The following references are hereby incorporated herein by reference.
[1] ITU-T Rec H.264 and ISO/IEC/MPEG 4 part 10, Advanced video coding for generic audiovisual services, November 2007
[2] SMPTE 421M, "VC-1 Compressed Video Bitstream Format and Decoding Process," April 2006.
[3] JM reference software JM18.2, located at hypertext transfer protocol, colon, slash-slash iphome.hhi.de/suehring/tml/download/jm18.2. zip, November, 2011.
[4] B. Bross, W.-J. Han, J.-R. Ohm, G. J. Sullivan, T. Wiegand. WD5: Working Draft 5 of High-Efficiency Video Coding. Document no JCTVC-G1103, November 2011.
[5] K. McCann, S. Sekiguci, B. Bross, W.-J. Han, HM5: HEVC Test Model 5 Encoder Description Document no JCTVC-G1102, December 2011.
[6] J. Boyce, R. Sjoberg, Y. K. Wang, BoG report: Reference picture buffering and list construction. Document no JCTVC-G1002, November 2011.
[7] D. Flynn, R. Sjoberg, et al, JCTVC AhG report: Reference picture buffering and list construction. Document no JCTVC-G021, November 2011.
[8] Y. Suzuki, et al, Extension of uni-prediction simplification in B slices. Document no JCTVC-D421, January 2011.
[9] B. Bross, W.-J. Han, J.-R. Ohm, G. J. Sullivan, T. Wiegand. WD9: Working Draft 9 of High-Efficiency Video Coding. Document no JCTVC-K1103, October 2012.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the exemplary embodiments are not limited to the above-mentioned memories and that other platforms and memories may support the described methods.

No element, act, or instruction used in the description of the present application should be construed as critical or essential unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

Although the systems and methods herein have been described in terms of a UWB multi-band communication system, it is contemplated that it may be implemented in software on microprocessors/general purpose computers (not shown). In certain embodiments, one or more of the functions of the various components may be implemented in software that controls a general purpose computer.

The invention claimed is:
1. A method for video decoding, comprising:
  decoding a first syntax element indicating a number of
    entries in a reference picture list for a current slice;

decoding a syntax flag, wherein said syntax flag equal to a first value indicates that an ordered list of reference pictures is modified to form said reference picture list for said current slice and indicates that each entry in said reference picture list is explicitly signaled by a respective index, of a set of indices, into said ordered list of reference pictures, and wherein said ordered list of reference pictures includes one or more short term reference pictures associated with said current slice; and for each entry in said reference picture list, decoding a syntax element specifying said respective index, of said set of indices, into said ordered list of reference pictures, said set of indices having a same number of indices as said number of entries in said reference picture list.

2. The method of claim 1, wherein said ordered list of reference pictures includes one or more short term reference pictures that are temporally before said current slice, ordered by temporal distance from said current slice, followed by one or more short term reference pictures that are temporally after said current slice, ordered by temporal distance from said current slice.

3. The method of claim 1, wherein no signaling is used to denote an end of reference picture list modification.

4. The method of claim 1, wherein no signaling is used to denote a type of modification for reference picture list modification.

5. A computer readable storage medium having stored thereon instructions for video decoding according to method 1.

6. A method for video encoding, comprising:
encoding a first syntax element indicating a number of entries in a reference picture list for a current slice;
encoding a syntax flag, wherein said syntax flag equal to a first value indicates that an ordered list of reference pictures is modified to form said reference picture list for said current slice and indicates that each entry in said reference picture list is explicitly signaled by a respective index, of a set of indices, into said ordered list of reference pictures, and wherein said ordered list of reference pictures includes one or more short term reference pictures associated with said current slice; and for each entry in said reference picture list, encoding a syntax element specifying said respective index, of said set of indices, into said ordered list of reference pictures, said set of indices having a same number of indices as said number of entries in said reference picture list.

7. The method of claim 6, wherein said ordered list of reference pictures includes one or more short term reference pictures that are temporally before said current slice, ordered by temporal distance from said current slice, followed by one or more short term reference pictures that are temporally after said current slice, ordered by temporal distance from said current slice.

8. The method of claim 6, wherein no signaling is used to denote an end of reference picture list modification.

9. The method of claim 6, wherein no signaling is used to denote a type of modification for reference picture list modification.

10. A computer readable storage medium having stored thereon instructions for video encoding according to method 6.

11. An apparatus for video decoding, comprising one or more processors and at least a memory coupled to said one or more processors, wherein said one or more processors are configured to:
decoding a first syntax element indicating a number of entries in a reference picture list for a current slice;
decoding a syntax flag, wherein said syntax flag equal to a first value indicates that an ordered list of reference pictures is modified to form said reference picture list for said current slice and indicates that each entry in said reference picture list is explicitly signaled by a respective index, of a set of indices, into said ordered list of reference pictures, and wherein said ordered list of reference pictures includes one or more short term reference pictures associated with said current slice; and for each entry in said reference picture list, decoding a syntax element specifying said respective index, of said set of indices, into said ordered list of reference pictures, said set of indices having a same number of indices as said number of entries in said reference picture list.

12. The apparatus of claim 11, wherein said ordered list of reference pictures includes one or more short term reference pictures that are temporally before said current slice, ordered by temporal distance from said current slice, followed by one or more short term reference pictures that are temporally after said current slice, ordered by temporal distance from said current slice.

13. The apparatus of claim 11, wherein no signaling is used to denote an end of reference picture list modification.

14. The apparatus of claim 11, wherein no signaling is used to denote a type of modification for reference picture list modification.

15. The apparatus of claim 11, wherein said reference picture list is reference picture list 0 or reference picture list 1.

16. An apparatus for video encoding, comprising one or more processors and at least a memory coupled to said one or more processors, wherein said one or more processors are configured to:
encoding a first syntax element indicating a number of entries in a reference picture list for a current slice;
encoding a syntax flag, wherein said syntax flag equal to a first value indicates that an ordered list of reference pictures is modified to form said reference picture list for said current slice and indicates that each entry in said reference picture list is explicitly signaled by a respective index, of a set of indices, into said ordered list of reference pictures, and wherein said ordered list of reference pictures includes one or more short term reference pictures associated with said current slice; and for each entry in said reference picture list, encoding a syntax element specifying said respective index, of said set of indices, into said ordered list of reference pictures, said set of indices having a same number of indices as said number of entries in said reference picture list.

17. The apparatus of claim 16, wherein said ordered list of reference pictures includes one or more short term reference pictures that are temporally before said current slice, ordered by temporal distance from said current slice, followed by one or more short term reference pictures that are temporally after said current slice, ordered by temporal distance from said current slice.

18. The apparatus of claim 16, wherein no signaling is used to denote an end of reference picture list modification.

19. The apparatus of claim 16, wherein no signaling is used to denote a type of modification for reference picture list modification.

20. The apparatus of claim 16, wherein said reference picture list is reference picture list 0 or reference picture list 1.

* * * * *